United States Patent
Jo

(10) Patent No.: US 10,222,021 B2
(45) Date of Patent: Mar. 5, 2019

(54) VEHICULAR LAMP

(71) Applicant: LG Electronics Inc., Seoul (KR)

(72) Inventor: Juung Jo, Seoul (KR)

(73) Assignee: LG Electronics Inc., Seoul (KR)

( * ) Notice: Subject to any disclaimer, the term of this patent is extended or adjusted under 35 U.S.C. 154(b) by 14 days.

(21) Appl. No.: 15/668,194

(22) Filed: Aug. 3, 2017

(65) Prior Publication Data

US 2018/0112846 A1 Apr. 26, 2018

(30) Foreign Application Priority Data

Oct. 25, 2016 (KR) .................. 10-2016-0139355

(51) Int. Cl.
| | |
|---|---|
| *F21S 43/00* | (2018.01) |
| *F21S 43/19* | (2018.01) |
| *F21S 43/239* | (2018.01) |
| *F21S 43/241* | (2018.01) |
| *B60Q 1/00* | (2006.01) |
| *F21S 43/13* | (2018.01) |
| *F21S 43/237* | (2018.01) |
| *F21S 43/245* | (2018.01) |
| *F21S 43/145* | (2018.01) |
| *G02B 6/00* | (2006.01) |

(52) U.S. Cl.
CPC ............ *F21S 43/13* (2018.01); *B60Q 1/0058* (2013.01); *F21S 43/145* (2018.01); *F21S 43/195* (2018.01); *F21S 43/237* (2018.01); *F21S 43/239* (2018.01); *F21S 43/241* (2018.01); *F21S 43/245* (2018.01); *F21S 43/00* (2018.01); *G02B 6/00* (2013.01)

(58) Field of Classification Search
CPC ........ F21S 43/00; F21S 43/195; F21S 43/239; F21S 43/241; B60Q 1/0058
USPC ........................................................ 362/541
See application file for complete search history.

(56) References Cited

U.S. PATENT DOCUMENTS

| | | | | |
|---|---|---|---|---|
| 10,082,277 | B2 * | 9/2018 | Dubosc | ............... F21V 19/0015 |
| 2008/0291685 | A1 * | 11/2008 | Misawa | ............... B60Q 1/2696 |
| | | | | 362/459 |
| 2013/0049570 | A1 * | 2/2013 | Natsume | .............. B60Q 1/0041 |
| | | | | 313/498 |
| 2014/0133128 | A1 | 5/2014 | Oh | |
| 2017/0113603 | A1 * | 4/2017 | Shin | ......................... B60Q 1/34 |
| 2017/0123292 | A1 | 5/2017 | Jarrahi | |

FOREIGN PATENT DOCUMENTS

| | | |
|---|---|---|
| DE | 10-2007-033706 | 1/2009 |
| EP | 1762775 | 3/2007 |
| EP | 3061654 | 8/2016 |

(Continued)

OTHER PUBLICATIONS

Extended European Search Report in European Application No. 17198013.9, dated Jan. 25, 2018, 7 pages.

*Primary Examiner* — Toan Ly
(74) *Attorney, Agent, or Firm* — Fish & Richardson P.C.

(57) ABSTRACT

A vehicular lamp includes a lamp housing; a base substrate disposed in the lamp housing; and a plurality of planar light sources. The plurality of planar light sources are disposed spaced apart from each other on the base substrate. Each of the plurality of planar light sources has a light emitting surface that protrudes from the base substrate and that forms a respective acute angle with the base substrate relative to a forward direction of the vehicular lamp.

20 Claims, 20 Drawing Sheets

(56) References Cited

FOREIGN PATENT DOCUMENTS

| | | |
|---|---|---|
| FR | 3025859 | 3/2016 |
| JP | 2013161560 A | 8/2013 |
| JP | 2015156362 A | 8/2015 |
| JP | 2016062893 | 4/2016 |
| JP | 2014007014 A | 6/2016 |
| JP | 2016527686 A | 9/2016 |
| JP | 2016152142 A | 1/2018 |
| KR | 2008070540 A | 7/2008 |
| KR | 2013021328 A | 3/2013 |

\* cited by examiner

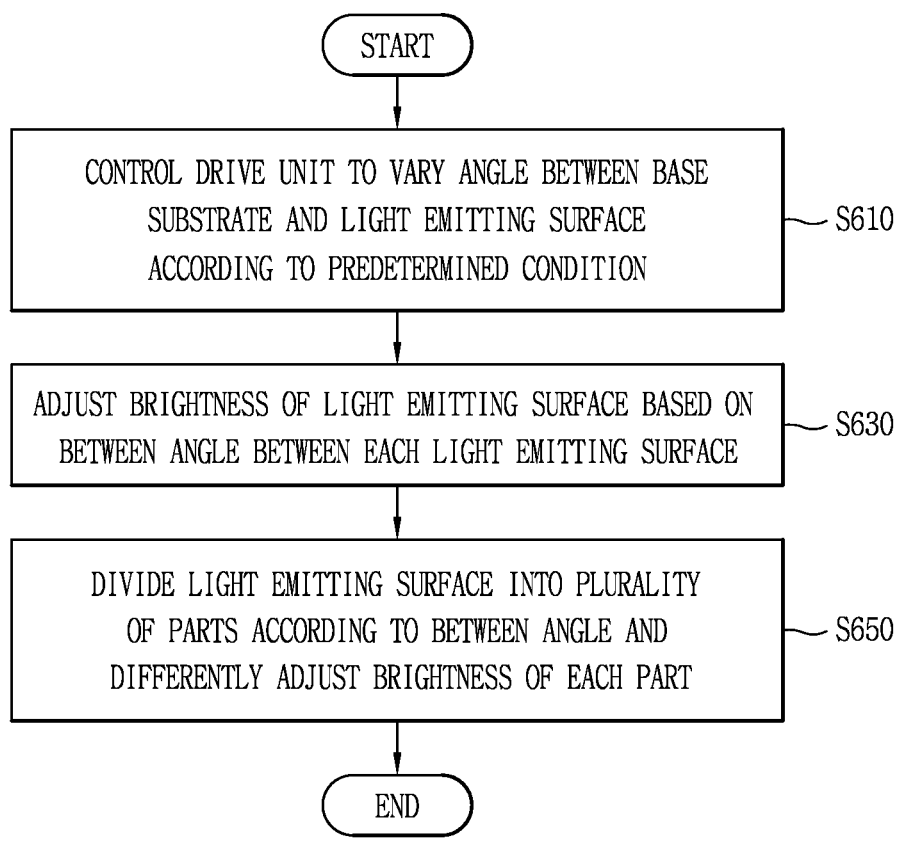

FIG. 8A
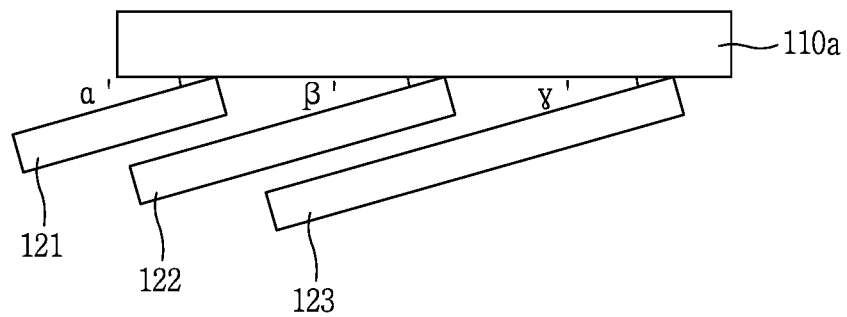
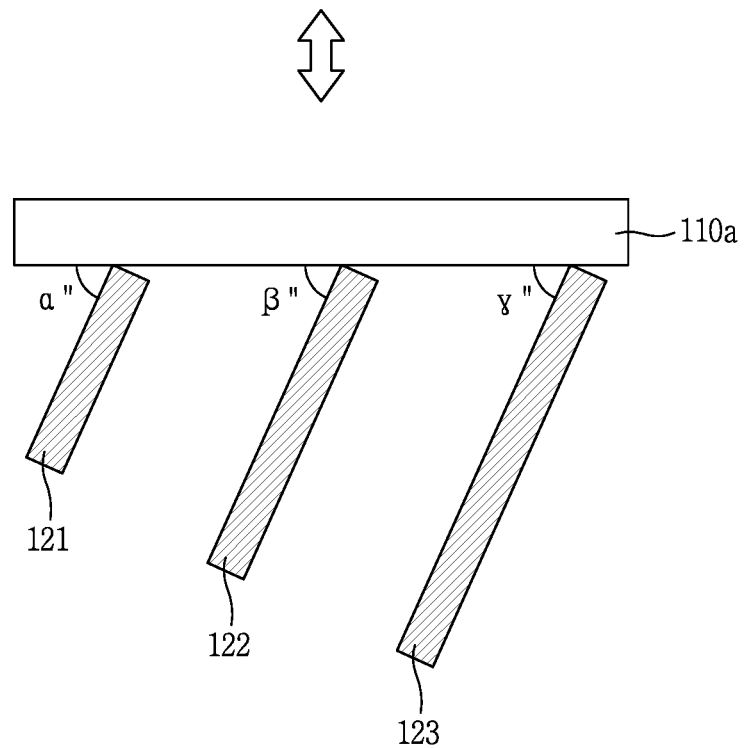

▨ LIGHT SOURCE

C-plaries
— 0.0-180.0
— 45.0-225.0
— 90.0-270.0
— 135.0-315.0

VEHICULAR LAMP

CROSS-REFERENCE TO RELATED APPLICATION

Pursuant to 35 U.S.C. § 119(a), this application claims the benefit of earlier filing date and right of priority to Korean Patent Application No. 10-2016-0139355, filed on Oct. 25, 2016, the contents of which is incorporated by reference herein in its entirety.

TECHNICAL FIELD

The present disclosure generally relates to a vehicular lamp, and more particularly, to a vehicular lamp for emitting light to the rear of a vehicle.

BACKGROUND

A vehicle is an apparatus that moves a passenger or goods in a desired direction. A typical example of a vehicle is an automobile.

Vehicles typically include, for the convenience of users, various sensors and electronic devices. For example, some vehicles include an Advanced Driver Assistance System (ADAS) that offers various convenience-enhancing features, in some cases by using data from sensors. As another example, some vehicles are implemented as an autonomous vehicle that autonomously performs one or more driving operations.

Vehicles are provided with various lamps that emit light. For example, a vehicle lamp may illuminate and help a user identify objects around a vehicle, or output a signal to inform those outside the vehicle regarding a state of the vehicle, etc.

As specific examples, a vehicle may be provided with a head lamp attached to the front of a vehicle and configured to illuminate the front, a fog lamp disposed around the head lamp to inform those outside the vehicle regarding the position of the vehicle, a turn signal lamp configured to output a signal regarding a turn direction of the vehicle, a break lamp configured to indicate a braking operation of the vehicle, a back-up lamp that illuminates when a vehicle is reversing, and a tail lamp configured to inform those behind the vehicle to recognize the rear of the vehicle. In some scenarios, one or more standards, such as legal or regulatory standards, may relate to installation standards or specifications of such vehicular lamps.

SUMMARY

Implementations disclosed here provide a vehicular lamp that is configured with a plurality of planar light sources disposed at angles on a base substrate.

In one aspect, a vehicular lamp may include a lamp housing; a base substrate disposed in the lamp housing; and a plurality of planar light sources disposed spaced apart from each other on the base substrate. Each of the plurality of planar light sources may have a light emitting surface that protrudes from the base substrate and that forms a respective acute angle with the base substrate relative to a forward direction of the vehicular lamp.

In some implementations, the plurality of planar light sources may be sequentially arranged along a direction from a forward end of the lamp housing to a rear end of the lamp housing. A first area of a first light emitting surface of a first planar light source may be different from a second area of a second light emitting surface of a second planar light source among the plurality of planar light sources.

In some implementations, areas of light emitting surfaces of the plurality of planar light sources may be arranged to monotonically increase in the direction from the forward end of the lamp housing to the rear end of the lamp housing.

In some implementations, a first rear surface of the first planar light source that faces the second light emitting surface of the second planar light source may include a reflective member configured to reflect light that is emitted from the second light emitting surface of the second planar light source.

In some implementations, the base substrate may have a first surface and a second surface. The plurality of planar light sources may include: a first group of planar light sources disposed on the first surface of the base substrate; and a second group of planar light sources disposed on the second surface of the base substrate.

In some implementations, each light emitting surface of the plurality of planar light sources may have a first end facing the base substrate and a second end that is opposite the first end. For the light emitting surfaces of the plurality of planar light sources, a distance between the first end and the second end of respective light emitting surfaces may be arranged to monotonically increase in the direction from a forward end of the lamp housing to a rear end of the lamp housing.

In some implementations, the first surface and the second surface of the base substrate may be inclined in different directions. Each light emitting surface of the plurality of planar light sources may have a first end facing the base substrate and a second end that is opposite the first end. For the light emitting surfaces of the plurality of planar light sources, a distance between the first end and the second end of respective light emitting surfaces may be arranged to be the same.

In some implementations, at least one light emitting surface among the plurality of planar light sources may have a first part directed toward a first direction and a second part directed toward a second direction different from the first direction.

In some implementations, the vehicular lamp may further include: a drive unit configured to rotate and move the plurality of planar light sources; and at least one processor configured to control the drive unit to vary an angle between the base substrate and at least one light emitting surface of the plurality of planar light sources according to a predetermined condition.

In some implementations, the at least one processor may be further configured to: based on a first collision likelihood with an object in a predetermined range being detected, control the drive unit to arrange the base substrate and each light emitting surface of the plurality of planar light sources to form a first angle within a first angle range; and based on a second collision likelihood with the object being detected, where the second collision likelihood is greater than the first collision likelihood, control the drive unit to arrange the base substrate and the each light emitting surface of the plurality of planar light sources to form a second angle within a second angle range.

In some implementations, the at least one processor may be further configured to selectively turn on or off each of the plurality of planar light sources.

In some implementations, the at least one processor may be configured to selectively turn on or off each of the plurality of planar light sources by: for a first set of planar light sources among the plurality of planar light sources that form angles with the base substrate within a first angle range, turn off the first set of planar light sources; and for a second set of planar light sources among the plurality of planar light sources that form angles with the base substrate within a second angle range different from the first angle range, turn on the second set of planar light sources.

In some implementations, each of the plurality of planar light sources may include: a substrate; a plurality of semiconductor light emitting elements disposed on the substrate and configured to emit light; and an optical member. The optical member may be disposed on the plurality of semiconductor light emitting elements and may be configured to change a light distribution pattern of light emitted from the plurality of semiconductor light emitting elements.

In some implementations, for each of the plurality of planar light sources, an air gap may be defined between the optical member of the planar light source and the plurality of light emitting elements of the planar light source.

In some implementations, the vehicular lamp may further include a support member disposed between the plurality of light emitting elements and the optical member to form the air gap in the planar light source.

In some implementations, the optical member of each of the plurality of planar light sources may include a plurality of thin film layers having a first refractive index.

In some implementations, the optical member of each of the plurality of planar light sources may include an optical layer formed of a light-transmitting material. A first surface of the optical layer may be formed of a plurality of protrusions having a first form that generates a first light distribution pattern.

In some implementations, a section of each protrusion of the plurality of protrusions of the first surface of the optical layer may have a triangular form having a first angle.

In some implementations, the first form of each protrusion of the plurality of protrusions of the first surface of the optical layer may be a triangular form.

In another aspect, a vehicle may include the vehicular lamp according to one or more implementations described above.

Further scope of applicability of the present disclosure will become more apparent from the detailed description given hereinafter. However, it should be understood that the detailed description and specific examples are given by way of illustration only, and that various changes and modifications within the spirit and scope of the disclosure may be made.

BRIEF DESCRIPTION OF THE DRAWINGS

FIG. 6 is a flowchart illustrating an example of controlling a vehicle or a vehicular lamp according to some implementations;

FIGS. 8A, 8B, and 8C are diagrams illustrating examples of operations of a vehicular lamp according to a control method of FIG. 6;

DETAILED DESCRIPTION

Figure 1A:
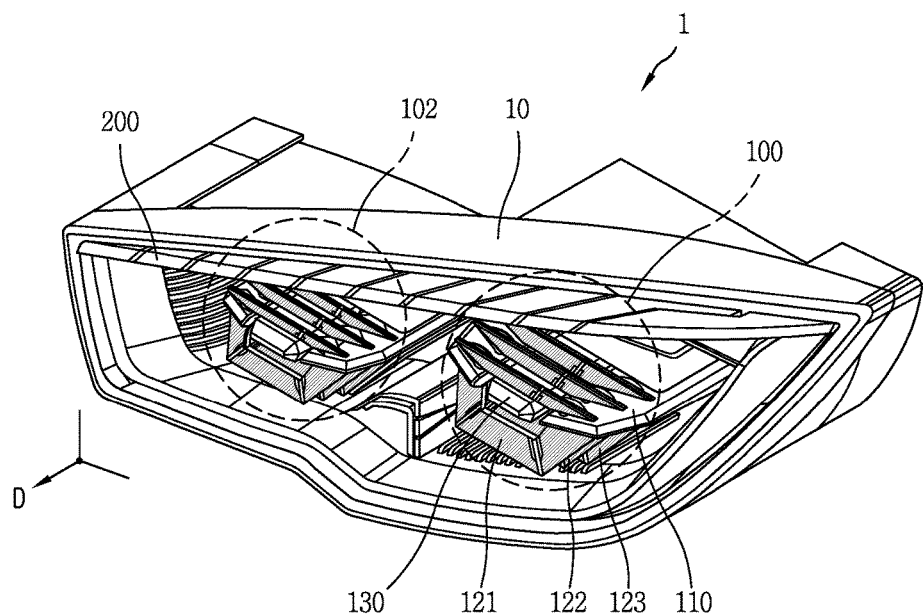
FIGS. 1A, 1B, and 1C are diagrams illustrating examples of a vehicular lamp according to some implementations.

A rear lamp is typically disposed on a rear side of a vehicle, and serves to help prevent rearward collisions. Examples of rear lamps include turn signal lamps, break lamps, and back-up lamps. A rear lamp may include a lens that forms an appearance of the lamp and that transmits light, a light emitting unit that emits light, and at least one processor, such as a controller, that controls an on/off state of the light emitting unit. In some scenarios, a rear lamp may implement a reflector that is made of an aspherical surface or that forms a fixed light distribution pattern by using a light guide.

In some scenarios, a vehicle may be designed to achieve a three-dimensional light distribution pattern. For example, some vehicles may utilize a planar light source in the vehicle lamp that is designed to achieve a three-dimensional light distribution pattern. However, planar light sources may face challenges in generating a sufficient amount of light, for example as specified by a standard such as a manufacturing, legal, and/or regulatory standard. Furthermore, structures of vehicular lamps often lack in integrated aesthetics and a high-level sensibility and usability for users.

In addition, because a lamp is a device that generates light to illuminate dark regions or to indicate signals, it may be desirable in some scenarios to generate various visual effects for both functional and aesthetic reasons. For example, when a lamp that was previously turned off is activated to turn on, it may be desirable to generate a visual effect such as a moving vehicle.

However, a typical lamp may face challenges in being unable to produce various three-dimensional effects due to having a shape that is fixed.

Implementations disclosed herein provide a vehicular lamp that is configured to produce various three-dimensional effects while emitting a sufficient quantity of light, for example to meet a threshold light quantity, e.g., according to legal or regulatory standards.

A vehicular lamp may be configured to form a three-dimensional structure by using the plurality of planar light sources, and mitigate interference between the plurality of planar light sources.

In some implementations, the vehicular lamp may be configured to generate a sufficient quantity of light (e.g., to meet a threshold quantity in a reduced area by compressing the light that is emitted from a planar light source.

In some scenarios, an illumination system installation method may be provided that reduces an amount of time to install an illumination system that includes a plurality of illumination devices.

A terminal may be included in an illumination system that receives visible light communication and that mitigates occurrences of errors while receiving the visible light communication performed by an illumination device.

In some implementations, an illumination system may recognize identification information of an illumination device using visible light communication of the illumination device. An illumination system may easily match identification information of an illumination device with an installation location using visible light communication.

A vehicle as described in this disclosure may include any suitable motorized transportation apparatus, such as a car, or a motorcycle. Hereinafter, various examples will describe implementations of a car.

A vehicle described in this disclosure may be powered by any suitable power source, and may be, for example an internal combustion engine vehicle having an engine as a power source, a hybrid vehicle having an engine and an electric motor as a power source, or an electric vehicle having an electric motor as a power source.

In the following description, the left side of the vehicle refers to the left side in the advancing direction of the vehicle, and the right side of the vehicle refers to the right side of the vehicle in the advancing direction.

According to some implementations, a vehicular lamp 1 may be a rear lamp provided on both sides of the rear of a vehicle to output a signal to the rear of the vehicle so as to prevent a rear collision. However, the present disclosure is not limited to the rear lamp, but may be modified into various lamps provided in a vehicle, such as a head lamp.

Hereinafter, for convenience of explanation, the present disclosure will be described using examples of a rear lamp provided at the right of a vehicle among rear lamps provided on both sides of the rear side of a vehicle. The present disclosure may also be applied to a case where a rear lamp is provided in the left direction of a vehicle but there is only a difference in the installation direction or shape (left and right reversal).

The left rear lamp disposed on the left side of a vehicle and the right rear lamp disposed on the right side of a vehicle may output the same signal at the same time under the control of at least one processor, such as a control unit. For example, when braking occurs in a vehicle, the brake light of the left rear lamp and the brake light of the right rear lamp may be simultaneously turned on.

Figure 1B:
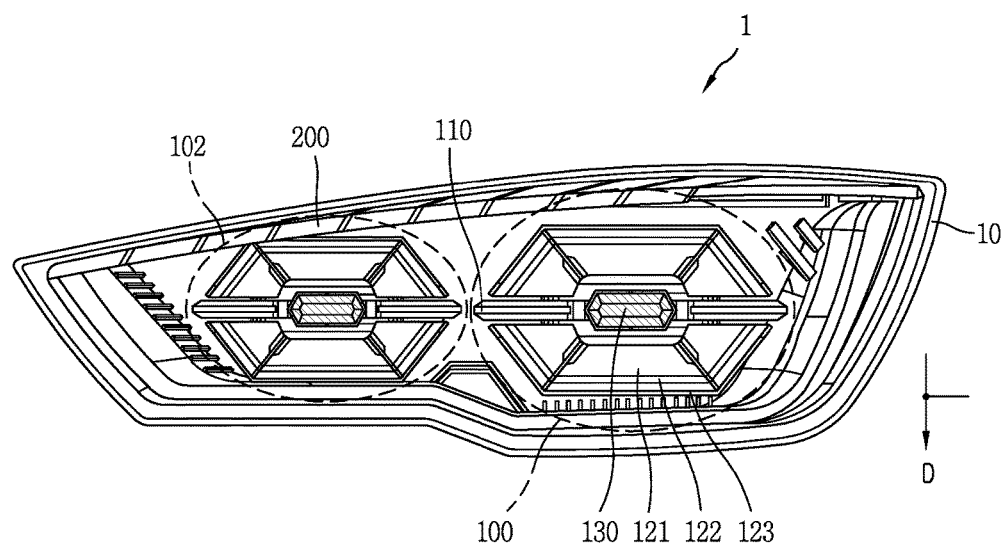
Figure 1C:
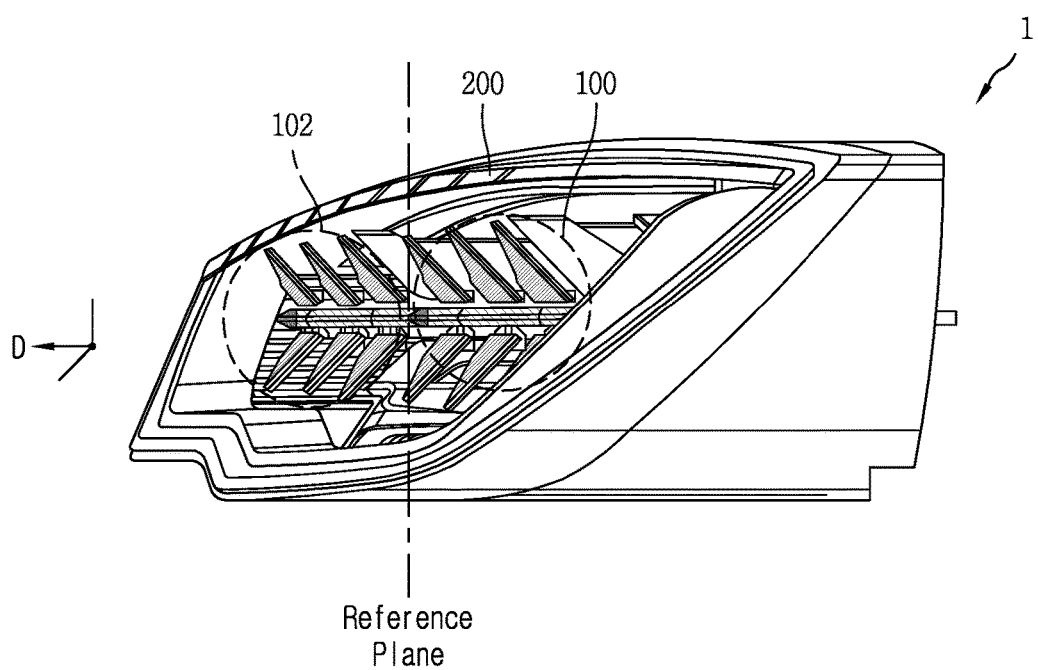

FIGS. 1A, 1B, and 1C are diagrams illustrating a vehicular lamp according to some implementations. FIG. 1A is a perspective view illustrating a vehicular lamp 1. FIG. 1B is a front view of the vehicular lamp 1 when seen from the front. FIG. 1C is a side view of the vehicular lamp 1 when seen from a side.

Referring to the drawings, the vehicular lamp 1 includes a main body 10 and at least one optical module 100 or 102.

The main body 10 forms the appearance of the vehicular lamp 1 and includes a light-transmitting lens for protecting one or more optical modules 100 and 102 therein from the outside. The main body 10 may be referred to as a lamp housing.

The optical module 100 includes a base substrate 110, a core light source 130, and a plurality of planar light sources 121, 122, and 123.

A reception groove 112 for receiving the core light source 130 is formed at one end of the base substrate 110. The reception groove 112 is formed so as to surround a part of the core light source 130 and may be formed in a straight line shape or in a bent shape (e.g., a "U" shape) on at least one part.

In some implementations, the core light source 130 is connected to the base substrate 110 by at least one connection part, and is fixed. The connection part also serves to electrically connect at least one processor, such as a control unit, which controls a control function such as on/off of the core light source 130, and the core light source 130.

A part of the core light source 130 is not received in the base substrate 110 and protrudes from the base substrate 110. Thereby, a part of the core light source 130 may be observed from the side as well as the front of the vehicular lamp 1 for vehicle.

In some implementations, one or more planar light sources may be disposed on the base substrate 110. For convenience of description, the present disclosure will describe implementations in which three planar light sources 121, 122, and 123 are disposed on one surface of a base substrate 110, as shown in FIGS. 1A and 1B. However, implementations are not limited to any particular number of planar light sources.

Figure 3A:
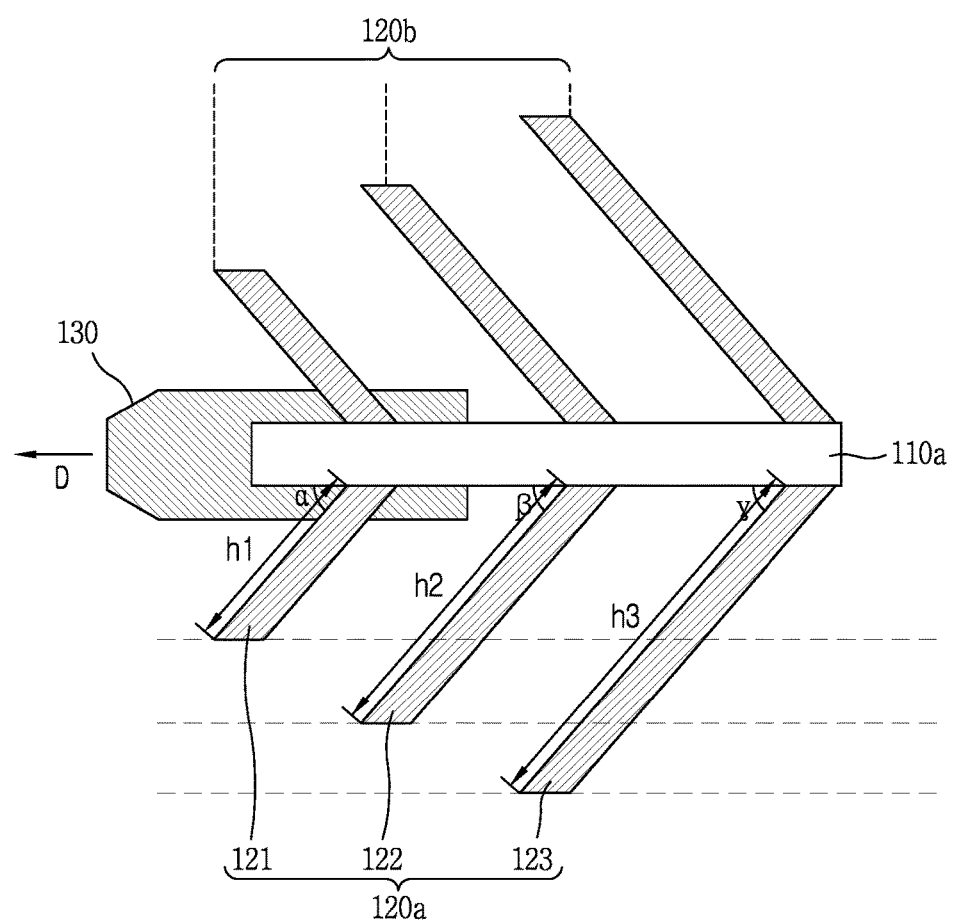
FIGS. 3A, 3B, 3C, and 4 are diagrams illustrating examples of a structure of planar light sources in a vehicular lamp according to some implementations.
Figure 3B:
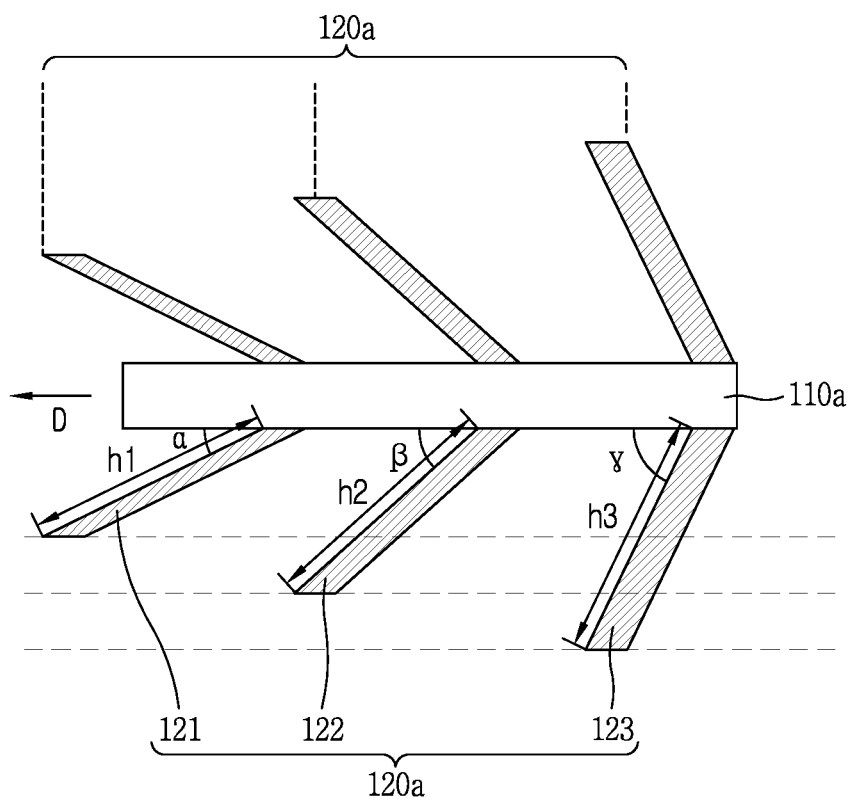
Figure 3C:
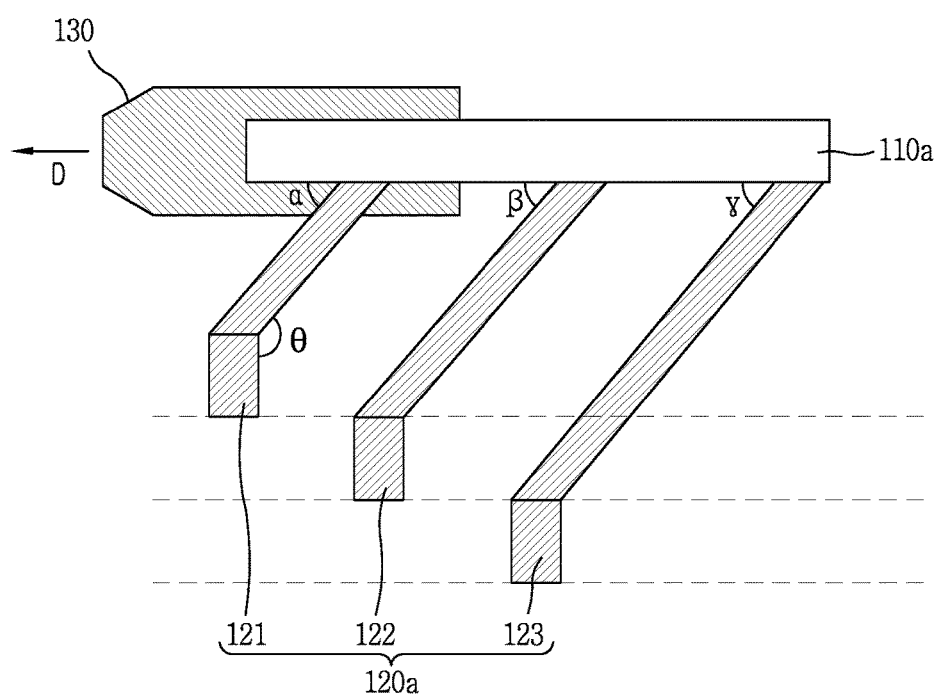

The three planar light sources 121, 122, 123 may be spaced apart from each other on the base substrate 110. Each of the planar light sources 121, 122, 123 may include a light emitting surface that forms an acute angle with the base substrate 110. For example, the light emitting surface of the planar light sources 121, 122, 123 may project outwardly from the base substrate 110, and form acute angles with base substrate 110 relative to a forward direction of the lamp D, as shown in the examples of FIGS. 3A to 3C.

The three planar light sources 121, 122, 123 may be sequentially arranged from one end of the main body of the vehicular lamp 1 to the other end.

As such, according to such arrangements, when the vehicular lamp 1 is seen from the front, if the first planar light source 121 is at the foremost position, then the second and third planar light sources 122 and 123 may be arranged sequentially behind the first planar light source 121. In the examples of FIGS. 1A to 1C and also as shown in FIGS. 3A to 3C, the planar light sources 121, 122, 123 may be sequentially arranged along the reference direction D on the base substrate 110.

In some implementations, a plurality of planar light sources may be classified into a first group or a second group depending on which surface of the base substrate 110 they are disposed. For example, planar light sources disposed on the first surface of the base substrate 110 may be classified into a first group, and the planar light sources disposed on the second surface of the base substrate 110 may be classified into a second group.

For example, the first surface of the base substrate 110 corresponds to a surface disposed at the lower part of the base substrate 110 with respect to the gravity direction, and the second surface of the base substrate 110 corresponds to a surface disposed at the upper part of the base substrate 110. In general, the second surface may correspond to an opposite surface of the base substrate 110 with respect to the first surface.

The light emitting surface of a planar light source included in the first group forms an acute angle with respect to the first surface of the base substrate 110 and the light emitting surface of a planar light source included in the second group forms an acute angle with respect to the second surface of the base substrate 110. The acute angles with base substrate 110 may be formed relative to the forward direction D of the lamp.

In such implementations where the light emitting surface of planar light sources 121, 122, 123 form acute angles with the base substrate 110, then as shown in FIG. 1B, when the vehicular lamp 1 is seen from the front, the planar light sources 121, 122, 123 may form a shape surrounding the core light source 130. Aesthetically, when compared to a human eye, the core light source 130 may be compared to a pupil, and the planar light sources 121, 122, 123 may have a comparable visual effect as an eyelid.

By such a sequential arrangement of planar light sources 121, 122, 123, in some implementations, a portion of the light emitting surface of the second planar light source 122 may be covered by the first planar light source 121, and a portion of the light emitting surface of the third planar light source 123 may be covered by the second planar light source 122. Aesthetically, this may create a visual effect comparable to a plurality of eyelids surrounding the core light source 130.

In some implementations, one or more of the planar light sources 121, 122, 123 may be bent so that a first part faces the front of the vehicular lamp 1, and a second part faces the side of the vehicular lamp 1. For example, the light emitting surface may consist of a first part facing the front surface of the vehicular lamp 1 and a second part facing the side surface of the vehicular lamp 1. The first part and the second part may be connected to each other continuously and form one surface facing different directions. Thereby, as shown in the example of FIG. 1C, the light emitting surface of the planar light sources 121, 122, 123 may be observed from the front surface and the side surface of the vehicular lamp 1.

When a first optical module 100 and a second optical module 102 are provided in the vehicular lamp 1, they may be classified based on a reference plane. For example, the planar light sources that are included in the first optical module 100 may be disposed on one side of the reference plane, and the planar light sources included in the second optical module 102 may be disposed on the other side of the reference plane.

For example, as shown in FIG. 1C, the planar light sources of the first optical module 100 are disposed at the right side with respect to the reference plane, and the planar light sources of the second optical module 102 are disposed at the left side with respect to the reference plane. Thereby, all the planar light sources included in the vehicular lamp 1 may be observed from the side of the vehicular lamp 1.

When a part of the core light source 130 is disposed to protrude from the base substrate 110, the core light source 130 may also be observed from the side of the vehicular lamp 1.

Due to such sequential arrangement of the planar light sources, the vehicular lamp 1 may have a three-dimensional structure. With such a three-dimensional structure, signals generated in the vehicular lamp 1 may be observed simultaneously from both the rear and from the side of the vehicle.

The core light source 130 and the planar light sources 121, 122, 123 may implement various types of lamp functionality for a vehicle, such as a taillight or a brake light of the vehicle.

According to some implementations, the core light source 130 may serve as a taillight, and the planar light sources 121, 122, 123 may serve as a brake lamp. Specifically, the core light source 130 may maintain a state (e.g., an on state) during driving, and the planar light sources 121, 122, 123 may be selectively turned on only when braking occurs in the vehicle. In this case, the core light source 130 may be turned on or off according functionality of a tail lamp that operates based on an amount of light around the vehicle. For example, when a vehicle travels at night or enters a tunnel or in an environment with reduced light around the vehicle, the core light source 130 may be turned on.

In some implementations, the core light source 130 may serve as a brake light, and the planar light sources 121, 122, 123 may serve as a tail lamp.

As another example, the core light source 130 and the planar light sources 121, 122, 123 may cooperate to both serve as a taillight and a braking light.

In this case, the planar light sources 121, 122, 123 may be turned on or off individually depending on the surrounding conditions. For example, under a general driving situation, the core light source 130 may be turned on with a first brightness, and a first group of planar light sources among 121, 122, 123 may be turned on, while the remaining planar light sources in a second group among 121, 122, 123 may be turned off. In a situation where braking occurs, the core light source 130 may be turned on with a second brightness that is brighter than the first brightness, and all the planar light sources 121, 122, 123 may be turned on. As a result, by selectively controlling the number of planar light sources among 121, 122, 123 that are activated, different amounts of light may be selectively output, for example in a braking situation, to comply with a threshold amount of light, e.g., according to legal or regulatory standards.

Figure 2:
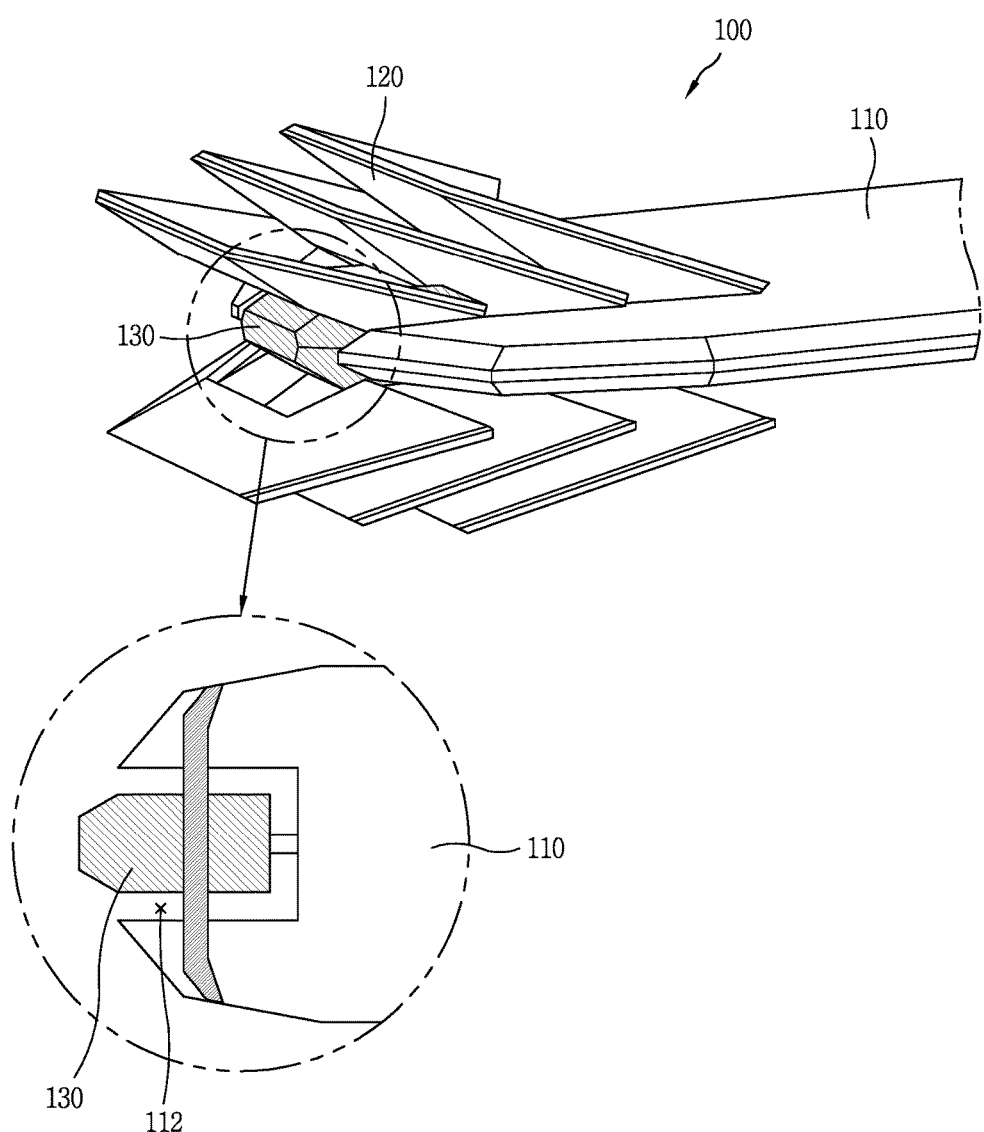
FIG. 2 is a diagram illustrating an example of details of a vehicular lamp according to some implementations.

FIG. 2 is a diagram illustrating a vehicular lamp according to some implementations. One optical module 100 in a vehicular lamp 1 is shown in FIG. 2.

The optical module 100 includes a base substrate 110, a core light source 130, and a plurality of planar light sources 120. The plurality of planar light sources 120 in FIG. 2 may include, for example, planar light sources 121, 122, 123 as shown in FIGS. 1A and 1B. The core light source 130 and the planar light sources 120 are physically and electrically connected to the base substrate 110.

A reception groove 112 for receiving the core light source 130 is formed at one end of the base substrate 110. The reception groove 112 is formed to surround a part of the core light source 130.

In some implementations, a part of the core light source 130 may protrude from the base substrate 110.

The planar light sources 120 may be disposed such that the light emitting surface of each planar light source forms an acute angle with the base substrate 110. As such, the planar light sources 120 are sequentially arranged in a direction from one end to the other end of the base substrate 110, and a layer-stacked three-dimensional structure is formed.

The base substrate 110 and the plurality of planar light sources 120 forming such a three-dimensional structure will be described in detail with reference to FIGS. 3A to 4B.

FIGS. 3A, 3B, 3C, and 4 are diagrams illustrating examples of a structure of planar light sources in a vehicular lamp according to some implementations.

As shown in the examples of FIGS. 3A, 3B, 3C, and 4, planar light sources 121, 122, and 123 may be sequentially arranged in a direction from one end of a base substrate 110a to the other end.

The planar light sources 121, 122, 123 may have light-emitting surfaces that project outwardly from the base substrate 110a. In some implementations, the light-emitting surfaces may form acute angles with base substrate 110a, relative to a forward direction of the lamp D, as shown in the examples of FIGS. 3A to 3C.

One or more of the planar light sources 121, 122, 123 may be designed to have a layer-stacked structure. When the light emitting surface of a planar light source is observed from the front of the vehicular lamp 1, the size of each planar light source may be different. For example, the light emitting surface of the first planar light source 121 and the light emitting surface of the second planar light source 122 may be different from each other in terms of area.

As shown in the example of FIG. 3A, the light emitting surface of the first planar light source 121 may be smaller than the light emitting surface of the second planar light source 122, and the light emitting surface of the second planar light source 122 may be smaller than the light emitting surface of the third planar light source 123. For example, the area of the light emitting surface may be provided to be gradually increased (or gradually decreased) according to the arrangement order of the planar light sources. According to such configurations, the light emitting surfaces of all the planar light sources 121, 122, and 123 may be observable at the front of the vehicular lamp, while the light emitting surface of each planar light source forms the same acute angle as the base substrate 110a ($\alpha=\beta=\gamma$).

Herein, the angle formed by the light emitting surface of the first planar light source 121 and the base substrate 110a is defined as a first angle $\alpha$, and the angle formed by the light emitting surface of the second planar light source 122 and the base substrate 110a is defined as a second angle $\beta$, and the angle formed by the light emitting surface of the third planar light source 123 and the base substrate 110a is defined as a third angle $\gamma$.

Moreover, the first, second, and third planar light sources 121, 122, and 123 may be continuously arranged, for example by having at least a part of the light emitting surface of the second planar light source 122 being covered by the first planar light source 121, and at least a part of the light emitting surface of the third planar light source 123 being covered by the first and second planar light sources 121 and 122.

According to such continuously arranged configurations, a portion of the light emitting surface of one planar light source that is covered by another planar light source may provide an observer with reflected light instead of direct light. Accordingly, one planar light source simultaneously provides direct light and reflected light to an observer, and a plurality of such planar light sources generate a three-dimensional structure of a lamp because the plurality of such planar light sources are continuously arranged.

In some implementations, the base substrate 110a has a first surface and a second surface, and a plurality of planar light sources may be classified as a first group 120a disposed on the first surface and a second group 120b disposed on the second surface. The second surface may correspond to the other surface with respect to the first surface, and the first surface may be a surface disposed at the lower part of the vehicular lamp 1 with respect to the gravity direction, and the second surface may be a surface disposed at the upper part of the vehicular lamp 1.

The light emitting surface of the planar light source in the first group 120a forms an acute angle with the first surface, and the light emitting surface of the planar light source in the second group 120b forms an acute angle with the second surface. Accordingly, the core light source 130 has a structure surrounded by the planar light sources in the first group 120a and the second group 120b.

In some implementations, the light emitting surface includes a first end that faces the base substrate 110a and a second end that is opposite the first end. A distance from the first end to the second end of the light-emitting surface may be referred to as the height of the light emitting surface, e.g., heights h1, h2, and h3 shown in FIGS. 3A and 3B. In some implementations, the planar light sources 121, 122, 123 may be arranged such that the height of each light emitting surface gradually increases according to the arrangement order (h1<h2<h3), as shown in the example of FIG. 3A. In this case, the height h1 of the first planar light source is smaller than the height h2 of the second planar light source, and the height h2 of the second planar light source is smaller than the height h3 of the third planar light source.

Alternatively, in some implementations, as shown in the example of FIG. 3B, the planar light sources 121, 122, 123 may have light-emitting surfaces having the same height (h1=h2=h3).

In the case of FIG. 3B, the angles formed by each light emitting surface and the base substrate 110a may be different from each other so that all the planar light sources may be observed from the front of the vehicular lamp 1. For example, the first angle $\alpha$ may be smaller than the second angle $\beta$, and the second angle $\beta$ may be smaller than the third angle $\gamma$. All the planar light sources may be observed from the front of the vehicular lamp 1 because the angle formed with the base substrate 110a is different depending on the arrangement order even if the heights of the light emitting surfaces are the same.

In some implementations, since the planar light source follows the Lambertian emission pattern, it has the dependency of the cosine function. Since the light emitting surface of the planar light source according to the present disclosure forms an acute angle with respect to the base substrate 110, the light efficiency is reduced. This may cause a problem that the amount of light required by law may not be satisfied.

In order to solve this problem, the one or more planar light sources may include at least one bent part, and may include a first surface and a second surface having different vertical lines with respect to any one bent part. For example, the light emitting surface of the planar light source may include a first part A facing the first direction and a second part B facing the second direction. Here, the first direction corresponds to a perpendicular line to the first part A, and the second direction corresponds to a perpendicular line to the second part B. Then, the second direction may be a direction D toward the front of the vehicular lamp 1. By the second part B facing the second direction, an insufficient amount of light may be additionally secured.

Figure 4:
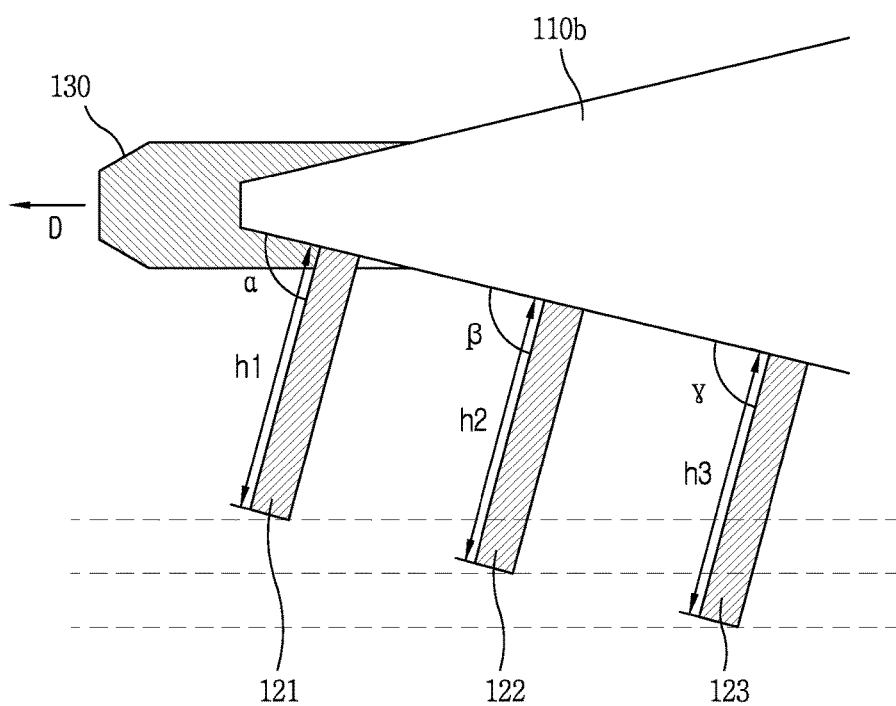

Referring to FIG. 4, the first and second surfaces of the base substrate 110b may be inclined in different directions with respect to the horizontal direction. In this case, the height of each light emitting surface may be the same, and the shapes of the planar light sources may be the same.

Even if the planar light sources having the same shape (h1=h2=h3) are arranged at the same angle with respect to the base substrate 110b ($\alpha=\beta=\gamma$), all the planar light sources may be observed from the front of the vehicular lamp 1 by the inclination of the base substrate 110b.

Accordingly, a manufacturer may manufacture a three-dimensional structure using the same planar light sources, mass-produce planar light sources, and reduce the cost of manufacturing planar light sources.

In some implementations, since the planar light sources are sequentially arranged, there is a problem that the light generated from the second planar light source 122 is reflected by the first planar light source 121 disposed in front of the light emitting surface of the second planar light source 122. In order to efficiently utilize the reflected light, one surface of the planar light source, for example the other surface with respect to the light emitting surface, may be consist of a reflective member such as a mirror or the like.

Figure 5A:
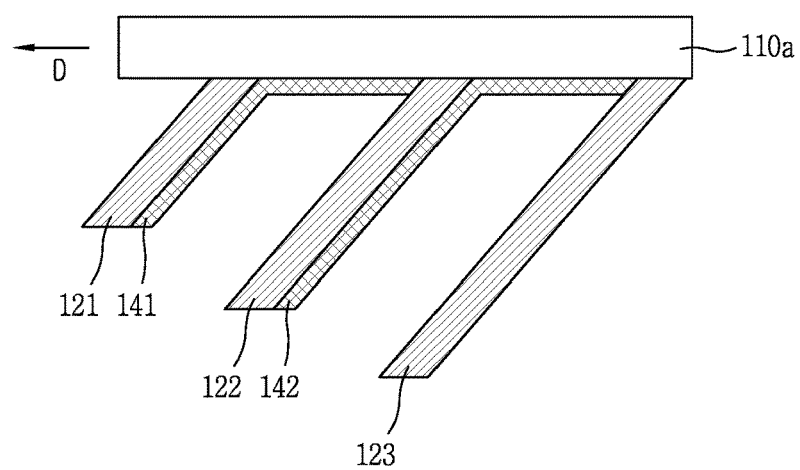
FIGS. 5A and 5B are diagrams illustrating examples of a vehicular lamp including a planar light source with a reflective member.
Figure 5B:
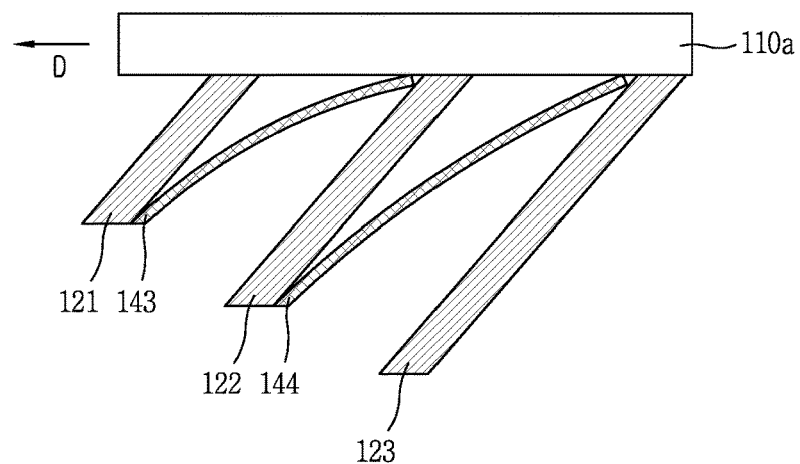

FIGS. 5A and 5B are diagrams illustrating examples of a vehicular lamp including a planar light source with a reflective member.

Referring to FIG. 5A, one surface of the first planar light source 121 facing the light emitting surface of the second planar light source 122 may include a first reflective member 141 for reflecting the light emitted from the second planar light source 122. Furthermore, one surface of the second planar light source 122 facing the light emitting surface of the third planar light source 123 may include a second reflective member 142 for reflecting the light emitted from the second planar light source 122.

At this time, in addition to one surface of the planar light source, a part of the base substrate may be provided with a reflective member.

The reflective member reflects the light directed toward the other planar light source disposed in front of the light emitting surface, so as to allow it to advance to the outside of the vehicular lamp 1. Thereby, a three-dimensional structure of a lamp is formed using a plurality of planar light sources to minimize an interference between the plurality of planar light sources.

In some implementations, as shown in FIG. 5B, the reflective members 143 and 144 may be disposed between the planar light sources 121 to 123, and may have a structure for efficiently reflecting light. For example, the reflective member may have a surface of a recessed curved line so as to focus the reflected light.

Figure 7:
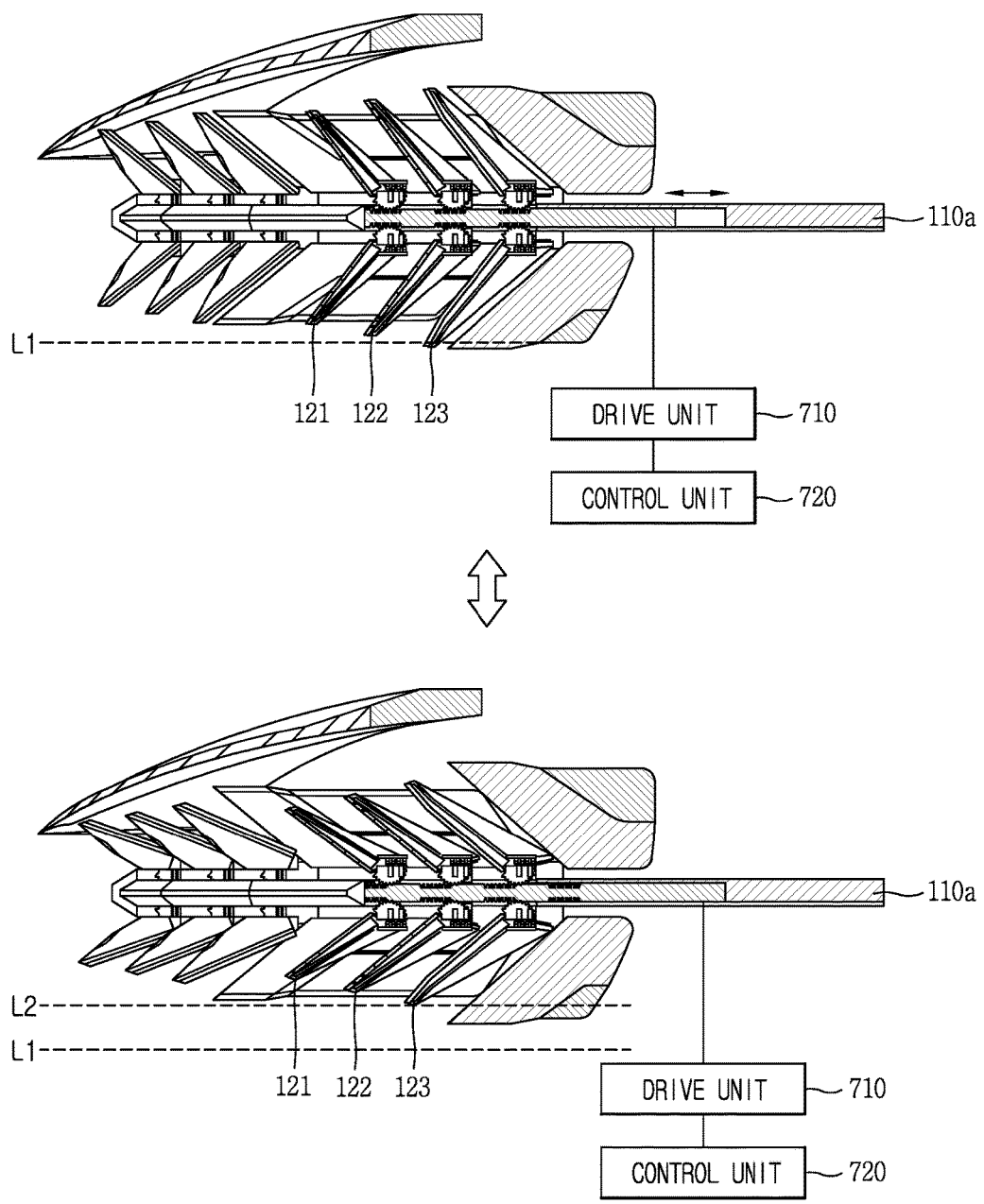
FIG. 7 is a diagram illustrating an example of a drive unit for driving planar light sources.
Figure 8B:
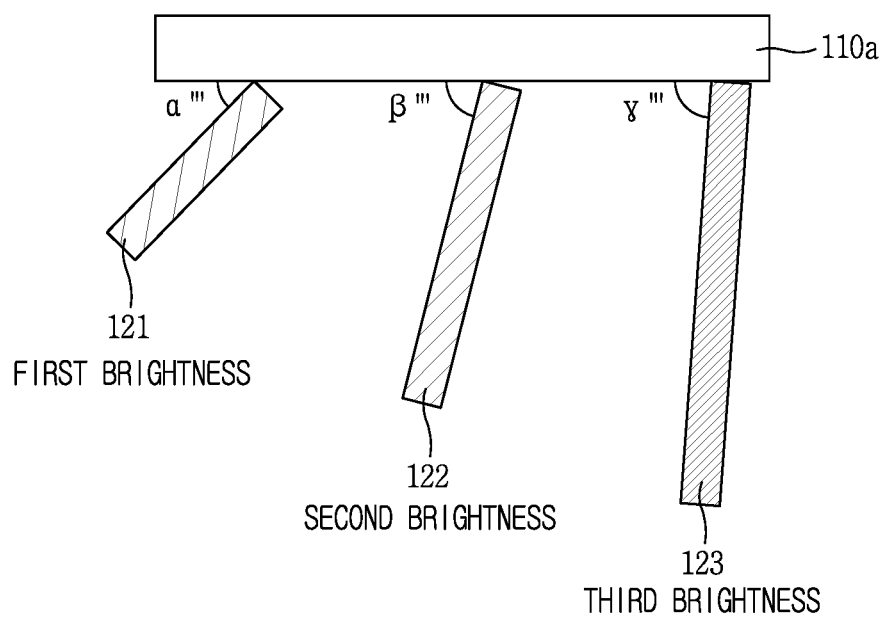
Figure 8C:
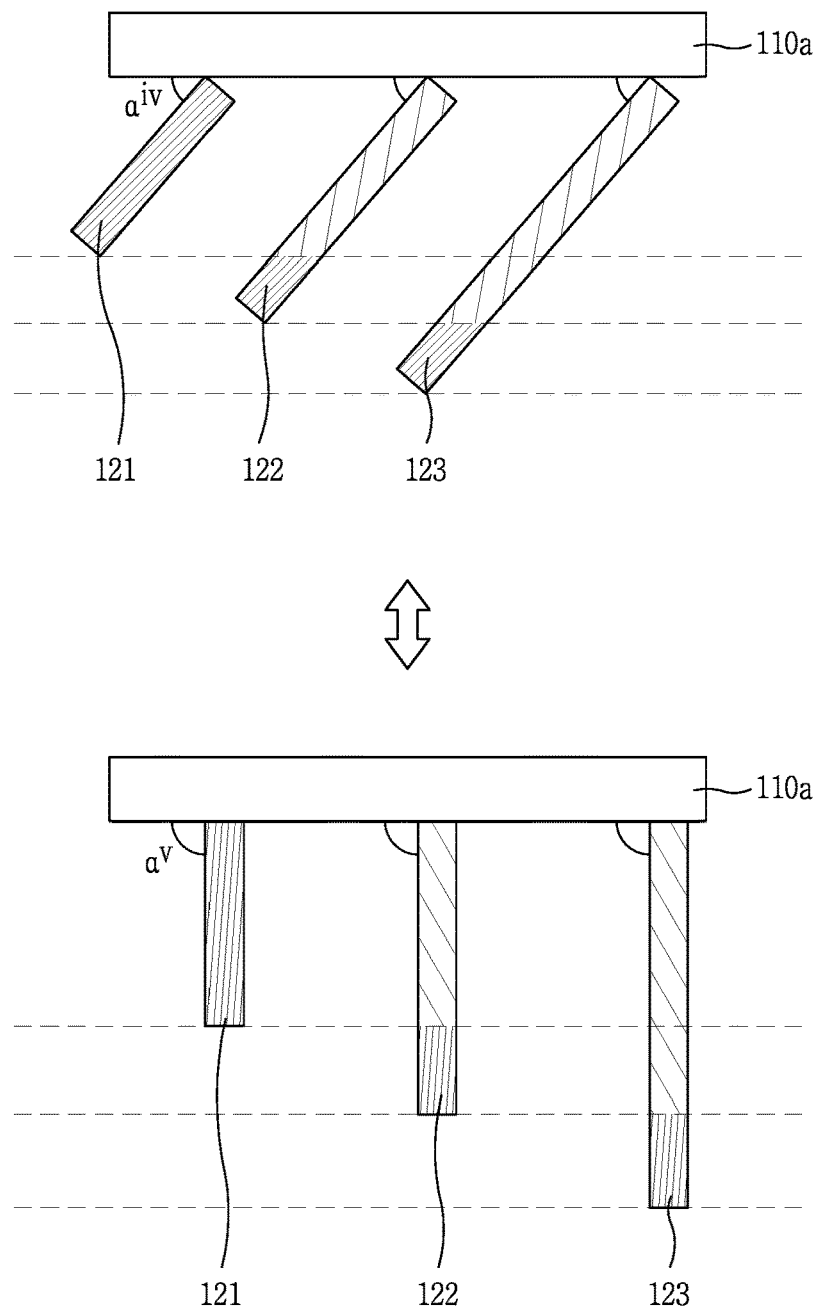

FIG. 6 is a flowchart illustrating a method of controlling a vehicle or a vehicular lamp according to some implementations and FIG. 7 is a diagram illustrating a drive unit for moving planar light sources. Furthermore, FIGS. 8A, 8B, and 8C are diagrams illustrating operations of a vehicular lamp according to a control method of FIG. 6.

A vehicular lamp according to the present disclosure may further include a drive unit 710 and at least one processor, such as control unit 720, configured to control the drive unit 710 according to a predetermined condition.

The drive unit 710 is configured to rotate at least one of the planar light sources included in the vehicular lamp 1. For example, as shown in FIG. 7, the drive unit 710 may be configured to linearly move the base substrate 110a, and the planar light sources may be rotated by the linear movement of the base substrate 110a. In this case, the light emitting surface of the planar light source forms an angle of at least one of a minimum angle and a maximum angle with the base substrate 110a depending on the position of the base substrate 110a.

In some implementations, a drive unit may be provided for each planar light source, so that each planar light source may rotate separately. In this case, the light emitting surface of each planar light source may have different acute angles.

The control unit 720 controls the drive unit 710 so that an angle between the base substrate 110a and each light emitting surface are changed according to predetermined conditions in operation S610.

Specifically, when a first condition is satisfied, a drive unit is controlled so that an angle between a base substrate and each light emitting surface is within a first angle range, and when a second condition is satisfied, the driving unit can be controlled so that the angle is within a second angle range.

If the second condition is satisfied after the first condition is satisfied, the planar light source is rotated and moved within the second angle range after disposed within the first angle range.

For example, as shown in FIG. 8A, when the start of the vehicle is turned off, the eyelids (=a planar light source) may be disposed within the first angle range as if it covered the pupil (=a core light source) and then, when the start of the vehicle is turned on, the eyelid may be rotated and moved within the second angle range as if the eyelid was opening ($\alpha' \to \alpha''$). When the planar light sources are disposed within the first angle range, they may be turned off and then turned on as rotated and moved within the second angle range. Thereby, the effect that the vehicle, which is a machine, is asleep and wakes up may occur.

For another example, in the case that there is no possibility of collision by an object within a predetermined range, while the planar light sources are disposed within the third angle range, if there is a possibility of collision by the object, the planar light sources may be rotated and moved with the fourth angle range.

As the collision possibility increases, the planar light sources may rotate and move so that an angle between the plane light source and the base substrate gradually increases. Since the planar light source is gradually raised depending on the collision possibility, a collision warning signal may be transmitted more effectively.

By the rotational movement of such planar light sources, various three-dimensional effects may be provided while securing the amount of light regulated by law. Furthermore, the effect as if the vehicle, which is a machine, had a life may occur.

Here, a predetermined condition and a between angle corresponding thereto may be stored in a memory.

The information stored in the memory may be updated when the vehicle communicates with the server. New information may be added to the memory, or information stored in the memory may be deleted or modified.

Then, the brightness of each light emitting surface may be adjusted based on the angle between each light emitting surface in operation S630.

Specifically, when the angle between the base substrate and each light emitting surface is within the first angle range, the planar light sources may be controlled to output a first brightness, and when the angle is within the second angle range, the light sources may be controlled to output a second brightness.

As shown in FIG. 8B, the control unit may rotate and move the planar light sources to have different between angles. At this point, the brightness to be outputted by each planar light source may be controlled based on an angle between each planar light source.

For example, the first planar light source 121 disposed within the first angle range outputs light with the first brightness, and the second planar light source 122 disposed within the second angle range outputs light with the second brightness, and the third planar light source 123 disposed within the third angle range outputs light with the third brightness.

Since the brightness of the planar light source is adjusted to interoperate with a between angle instead of simply adjusting of the brightness, the vehicular lamp 1 may generate various three-dimensional effects.

Then, one light emitting surface may be divided into a plurality of parts according to a between angle, and the brightness of each part may be adjusted differently in operation S650.

When the first planar light source is disposed at a first angle and the second planar light source is disposed at a second angle, depending on the first angle and the second angle, a part covered by the first planar light source in the second planar light source may vary.

The control unit 720 may divide the light emitting surface of the second planar light source into a sub part covered by the first planar light source and a main part not covered by the first planar light source, based on the first angle and the second angle.

The sub part provides reflected light to an observer, and the main part provides direct light to an observer. The sub part providing the reflected light and the main part providing the direct light are changed depending on the first angle and the second angle.

The control unit 720 may divide the second planar light source into the sub part and the main part based on the first angle and the second angle. In some implementations, the control unit 720 may control the brightness of the sub part providing the reflected light to be darker than that of the main part.

In some implementations, when the planar light source outputs the same light, the brightness of the light provided by the planar light source may vary depending on the width of the main part. In order for the rear lamp to provide a sufficient amount of light, for example to satisfy a threshold amount of light, the rear lamp may output different intensities of light according to the width of the main part. The control unit 720 may adjust the brightness of the main part based on the width of the main part in order to output light of a sufficient amount, such as to satisfy a threshold amount.

As such, in some scenarios, a vehicular lamp according to the present disclosure may efficiently manage the power consumed by the planar light sources while outputting light of a sufficient amount, so as to satisfy a threshold (e.g., according to regulations).

Hereinafter, the planar light source of the above-described vehicular lamp will be described more specifically. In some implementations, the planar light source uses a passive matrix (PM) type semiconductor light emitting element as a light source using a semiconductor light emitting element and this is exemplified. However, an example described below may also be applied to Active Matrix (AM) type semiconductor light emitting element.

Figure 9:
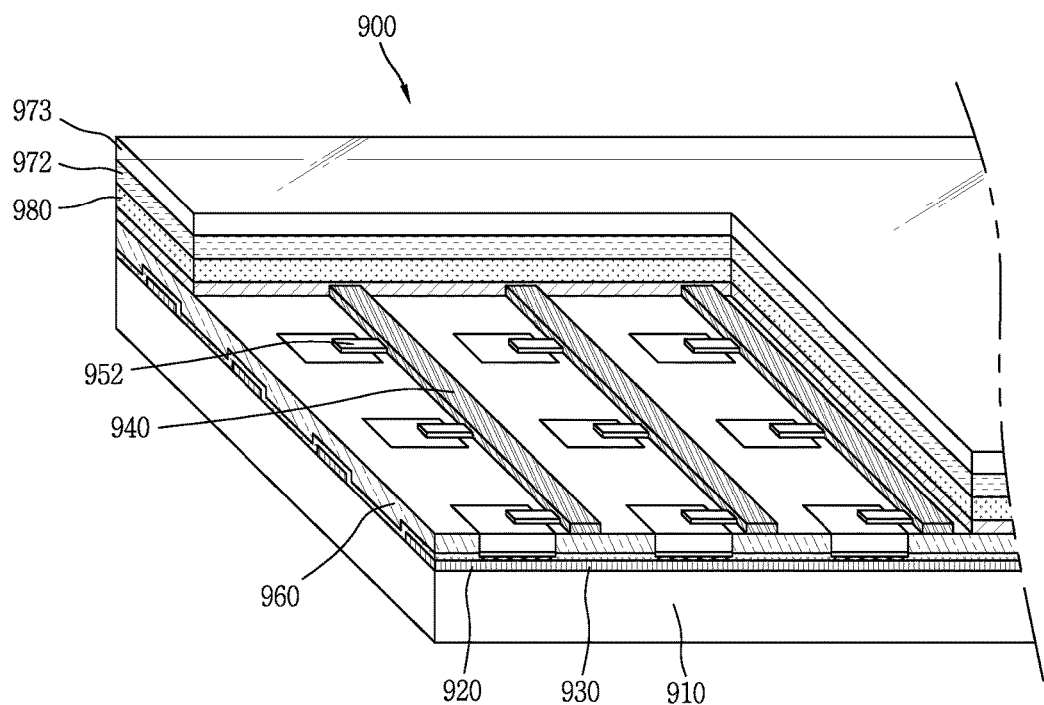
FIG. 9 is a diagram illustrating an example of a planar light source of a vehicular lamp using a semiconductor light emitting element.
Figure 10:
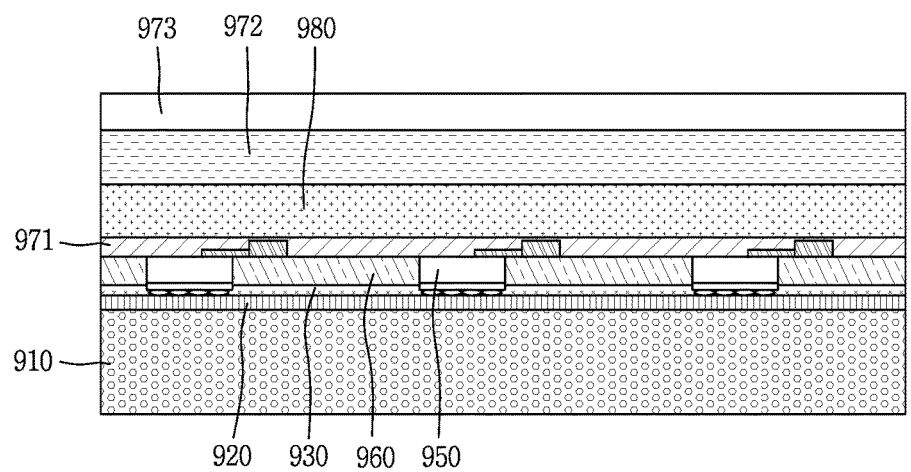
FIG. 10 is a diagram illustrating an example of a sectional view of a planar light source of FIG. 9.

FIG. 9 is a diagram illustrating a planar light source of a vehicular lamp using a semiconductor light emitting element and FIG. 10 is a sectional diagram of an example of a planar light source of FIG. 9.

The planar light source 900 includes a substrate 910, a first electrode 920, an adhesive layer 930, a second electrode 940, and a plurality of semiconductor light emitting elements 950.

The substrate 910 may be a base layer where a structure is formed through an entire process, and may be a wiring substrate where the first electrode 920 is disposed. The substrate 910 may include glass or polyimide (PI) to implement a flexible planar light source. Additionally, the substrate 910 may be formed of a thin metal. In addition, any insulating and flexible material such as polyethylene naphthalate (PEN) and polyethylene terephthalate (PET) may be used for the substrate 910. Moreover, the substrate 910 may be formed of a transparent material or an opaque material.

In some implementations, a heat radiation sheet, a heat sink, or the like may be mounted on the substrate 910 to implement a heat radiation function. In this case, the heat radiation sheet or the heat sink may be mounted on the opposite surface of the surface where the first electrode 920 is disposed.

A plurality of first electrodes 920 may be disposed on the substrate 910 and may serve as data electrodes.

An adhesive layer 930 is formed on the substrate 910 where the first electrode 920 is disposed.

The adhesive layer 930 may be a layer having adhesiveness and conductivity. To this end, the adhesive layer 930 may be mixed with a material having conductivity and a material having adhesiveness. Thus, the adhesive layer 930 may be referred to as a conductive adhesive layer. In addition, the adhesive layer 930 has flexibility, thereby enabling a flexible function in a planar light source.

As such an example, the adhesive layer 930 may be an anisotropic conductive film (ACF), an anisotropic conductive paste, a solution containing conductive particles, or the like. The adhesive layer 930 may be configured as a layer having electrical insulation in the horizontal X-Y direction while allowing electrical interconnection in the Z direction penetrating the thickness. Accordingly, the adhesive layer 930 may be referred to as a Z-axis conductive layer.

The anisotropic conductive film is a film in which an anisotropic conductive medium is mixed with an insulating base member. When heat and pressure are applied, only a specific part has conductivity by the anisotropic conductive medium. Hereinafter, although it is described that heat and pressure are applied to the anisotropic conductive film, other methods may be possible to allow the anisotropic conductive film to have conductivity partially. Such a method, for example, may be applying one of the heat or the pressure or UV curing.

In addition, the anisotropic conduction medium may be, for example, a conductive ball or a conductive particle. As shown in the drawing, according to this implementation, the anisotropic conductive film is a film in which a conductive ball is mixed with an insulating base member, and only a specific part has conductivity by the conductive ball when heat or pressure is applied. The anisotropic conductive film may have a state in which a core of a polymer material contains a plurality of particles coated by an insulation layer of a polymer material. In this case, when a part where heat and pressure are applied is to have conductivity by the core as the insulation layer is destroyed. At this point, the shape of the core may be deformed to form layers contacting each other in the thickness direction of a film. As a more specific example, heat and pressure are applied to the anisotropic conductive film as a whole, and the electrical connection in the Z-axis direction is partially formed by the height difference between counter matters bonded by the anisotropy conductive film.

As another example, the anisotropic conductive film may have a state in which a plurality of particles coated with a conductive material are contained in an insulation core. In this case, a part where heat and pressure are applied has conductivity in the thickness direction of the film as a conductive material is deformed (i.e., pressed and stuck). As another example, a conductive material penetrates the insulating base member in the Z-axis direction so that it is possible to have conductivity in the thickness direction of the film. In this case, the conductive material may have a pointed end part.

As shown in the drawing, the anisotropic conductive film may be a fixed array anisotropic conductive film (ACF) in a form that conductive balls are inserted into one surface of an insulating base member. In more detail, an insulating base member is formed of a material having adhesiveness. Conductive balls are centrally disposed at the bottom part of the insulating base member, and when heat and pressure are applied to the insulating base member, the insulating base member is deformed together with the conductive balls so that it has conductivity in a vertical direction.

However, the present disclosure is not necessarily limited thereto. The anisotropic conductive film may have a form in which conductive balls are randomly mixed with an insulating base member or a form (e.g., a double-ACF) in which a plurality of layers are configured and conductive balls are disposed on any one layer.

The anisotropic conductive paste may be a paste in which conductive balls are mixed with an insulating and adhesive base material as a coupling form of a paste and conductive balls. In addition, solutions containing conductive particles may be solutions in the form of containing conductive particles or nanoparticles.

In a state that the first electrode 920 is disposed on the substrate 910, for example, if the semiconductor light emitting element 950 is connected by applying heat and pressure after an anisotropic conductive film is disposed, the semiconductor light emitting element 950 is electrically connected to the first electrode 920. At this point, the semiconductor light emitting element 950 may be preferably disposed on the first electrode 920. In addition, since the anisotropic conductive film contains an adhesive component, the adhesive layer 930 realizes not only an electrical connection but also a mechanical coupling between the semiconductor light emitting element 950 and the first electrode 920.

As another example, as the adhesive layer 930 may include a tin-based alloy, Au, Al, or Pb for eutectic bonding, the substrate 910 and the semiconductor light emitting element 950 may be bonded by Eutectic bonding.

Since the semiconductor light emitting element 950 has excellent luminance, individual unit pixels may be formed with a small size. In relation to the size of such the individual semiconductor light emitting element 950, it may have one side of 80 µm or less and may be a rectangle or square device. In this case, the area of a single semiconductor light emitting element may be in the range of $10^{-10}$ to $10^{-5}$ $m^2$, and an interval between light emitting devices may be in the range of 100 um to 10 mm.

The semiconductor light emitting element 950 may have a vertical structure.

A plurality of second electrodes 940 are disposed between vertical semiconductor light emitting elements and are electrically connected to the semiconductor light emitting element 950.

The plurality of semiconductor light emitting elements 950 constitute a light emitting element array and an insulation layer 960 is formed between the plurality of semiconductor light emitting elements 950. For example, the insulation layer 960 is formed on one side of the adhesive layer 930 to fill a space between the semiconductor light emitting elements 950.

However, the present disclosure is not limited thereto, and a structure in which the adhesive layer 930 fills a space between the semiconductor light emitting elements 950 without the insulation layer 960 is also possible.

The insulation layer 960 may be a transparent insulation layer including silicon oxide (SiOx) or the like. As another example, the insulation layer 960 may be formed of epoxy with excellent insulation properties and low optical absorption, or polymer materials such as methyl or phenyl series silicon, or inorganic materials such as SiN and Al2O3 as a structure for preventing a short circuit between electrodes.

Referring to the drawing, a phosphor layer 980 is formed in the light emitting element array.

The phosphor layer 980 may be formed on one surface of the semiconductor light emitting element 950. For example, the semiconductor light emitting element 950 is a blue semiconductor light emitting element that emits blue (B) light, and the phosphor layer 980 for converting the blue (B) light into another color may be provided. In this case, the phosphor layer 980 may include a red phosphor for converting blue light into red (R) light, a green phosphor for converting blue light into green (G) light, or a yellow phosphor for converting blue light into white (W) light.

In this case, an optical gap layer 171 may exist between the semiconductor light emitting element 950 and the phosphor layer 980. The optical gap layer 171 may be made of a material such as epoxy, acrylic, or methyl or phenyl-based silicone having low light absorption and excellent bending properties. In addition, a patterned sheet may be inserted for optimizing the light efficiency, or particles having different refractive indices may be mixed.

In some implementations, a color filter 972 may be stacked on the phosphor layer 980 to improve the color purity of the converted light. In addition, a protective layer 973 may be formed to cover the color filter 972 so as to protect a planar light source from moisture, oxygen, and external impact. At this point, the protective layer 973 may be implemented through film contact or resin coating.

The above-described planar light source forms a light distribution in a direction that is perpendicular to a surface of the planar light source. If the light emitting surface of a planar light source has a Lambertian reflectance, then the planar light source may not sufficiently achieve a light distribution that satisfies a threshold, e.g., to comply with regulations.

Hereinafter, a structure for changing the Lambertian reflectance of a planar light source will be described in detail.

Figure 11A:
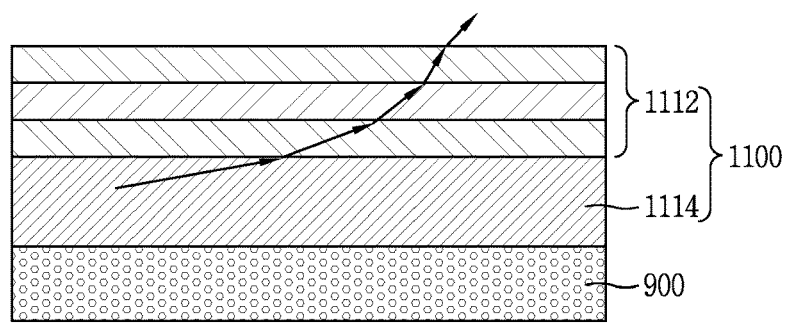
FIGS. 11A, 11B, 11C, and 11D are diagrams illustrating examples of a structure of planar light sources for compressing light according to some implementations.
Figure 11B:
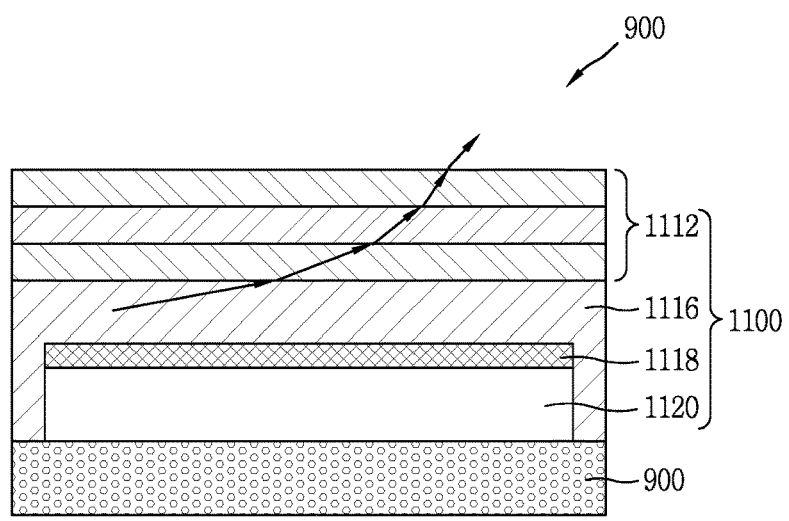
Figure 11C:
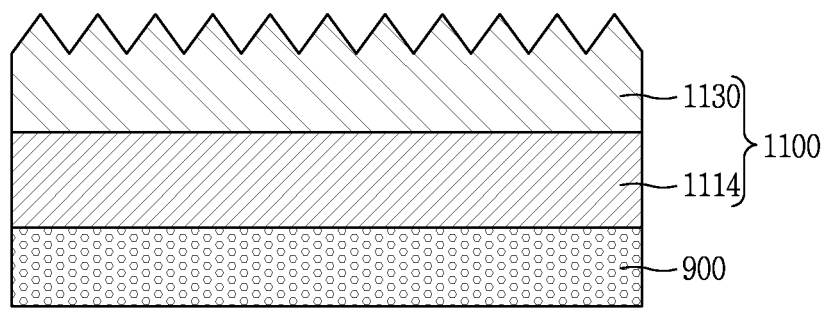
Figure 11D:
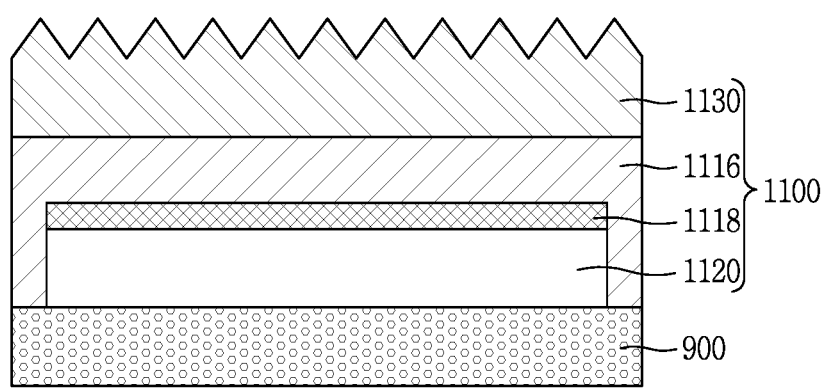
Figure 12A:
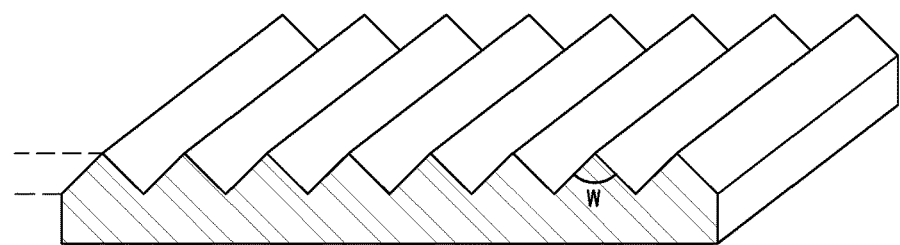
FIGS. 12A and 12B are diagrams illustrating examples of an optical member for compressing light.
Figure 12B:
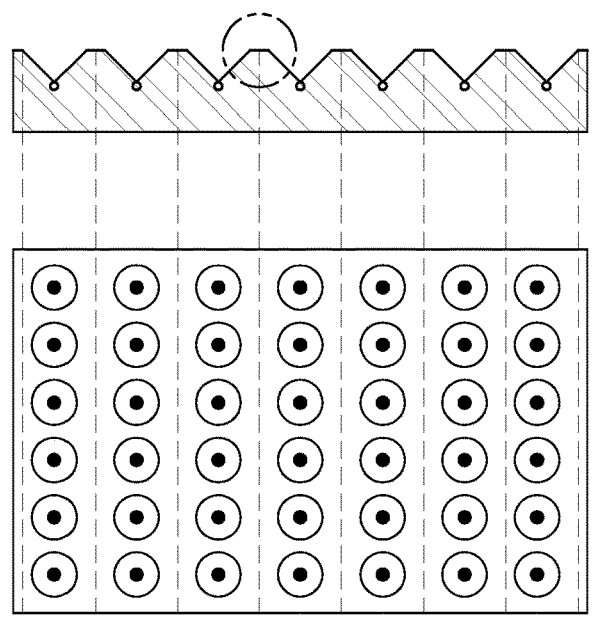

FIGS. 11A, 11B, 11C, and 11D are diagrams illustrating examples of a structure of a planar light source for compressing light, and FIGS. 12A and 12B are diagrams illustrating examples of the form of an optical member for compressing light.

A planar light source according to the present disclosure may include a substrate, a plurality of semiconductor light emitting elements disposed on the substrate and configured to emit light, and an optical member 1100. The optical member 1100 may be disposed on the plurality of semiconductor light emitting elements and may be configured to change the light distribution pattern of light emitted from the plurality of semiconductor light emitting elements.

As examples, the planar light source according to the present disclosure may include the optical member 1100 on the planar light source 900 described in FIGS. 9 and 10.

The optical member 1100 may be configured to compress the light distribution pattern of a planar light source, and may be a front substrate disposed on the planar light source and configured to emit light. In this case, the optical member 1100 may be disposed to cover the planar light source 900 at a position spaced apart from the planar light source 900 and may be implemented as an optical sheet having a structure for preventing the reflection of light and increasing a transmittance. At this point, the optical member 1100 may be a front substrate serving to protect the planar light source 900 from an external impact in addition to an optical function.

The optical member 1100, as shown in FIGS. 11A and 11B, may consist of a plurality of thin film layers 1112 having a predetermined refractive index or as shown in FIGS. 11C and 11D, may consist of an optical layer 1130 formed of a light emitting material.

First, a case that the optical member 1100 consists of the plurality of thin film layers 1112 will be described.

When the optical member 1100 consists of the plurality of thin film layers 1112, a low-refractive adhesive layer 1114 is disposed between the optical member 1100 and the plurality of thin film layers 1112. In relation to the plurality of thin film layers 1112, a plurality of thin film layers having a predetermined refractive index compress light emitted from the planar light source 900.

The reflection of light is determined by the Fresnel equation by which the loss of light due to reflection is calculated depending on the refractive index of each medium through which light passes. By using this in reverse, it is possible to further compress light by reflection. As shown in FIGS. 11A and 11B, as the light that has passed through the low-refractive adhesive layer 1114 passes through the thin film layers 1112 having a predetermined refractive index, it is compressed to the front of a planar light source.

As another example, the optical member 1100 may include the optical layer 1130 instead of the plurality of thin film layers 1112. One surface of the optical layer 1130 may be formed of a plurality of protrusions having a predetermined shape so as to form a predetermined light distribution pattern. The light emitted from the planar light source 900 is compressed toward the front of the planar light source 900 as it passes through the optical layer 1130.

As shown in FIG. 12A, each protrusion may have a section in triangle shape having a predetermined angle w, or as shown in FIG. 12B, a plurality of protrusions may have a triangle shape.

In some implementations, the light progressing to the outside of the planar light source 900 may be totally reflected on the surface of the planar light source 900. More specifically, a part of the light directed to the outside of the planar light source 900 may be totally reflected on the surface of the planar light source 900 contacting the outside.

When light is totally reflected on the surface of the planar light source 900, the brightness of the planar light source 900 decreases. For example, the total reflection on the surface of the planar light source 900 may be a factor for reducing the light efficiency of the planar light source 900.

The total reflection problem on the surface of the planar light source 900 may be addressed by configuring the planar light source 900 to further include an air gap 1120 between the phosphor layer 980 and the semiconductor light emitting elements 950. Furthermore, the air gap 1120 may be further included between the planar light source 900 and the optical member 1100.

Referring to FIGS. 11B and 11D, the optical member 1100 includes an optical gap layer 1116 for forming an air gap between the planar light source 900 and the optical member 1100. When the light that has passed through the air gap 1120 travels to the outside the planar light source 900, total reflection does not occur. This is because the air gap 1120 and an external medium of the planar light source 900 are the same.

In some implementations, a support member may be further included to define an air gap 1120 to be formed between the optical gap layer 1116 and the planar light source 900. The support member may be formed of a light-transmitting material, for example, may be formed of a polymeric material.

In some scenarios, in order to reduce Fresnel loss, a micropattern layer 1118 may be further provided when an air gap is formed, and a low-refractive adhesive layer 1114 may be further provided when an air gap is not formed.

Figure 13A:
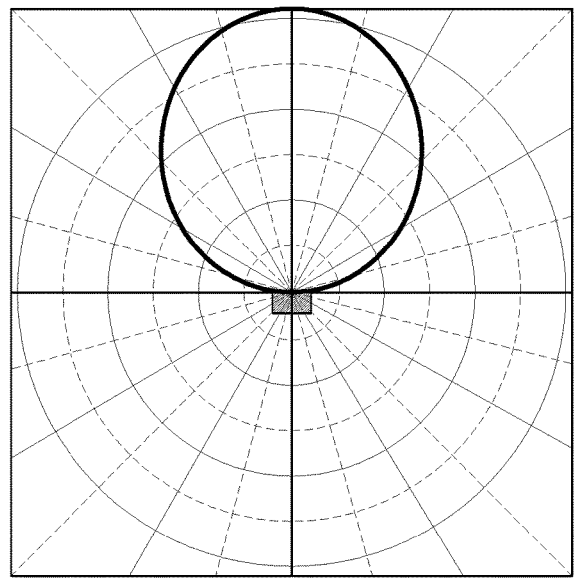
FIG. 13A is a diagram illustrating an example of a light distribution pattern of a typical planar light source.
Figure 13B:
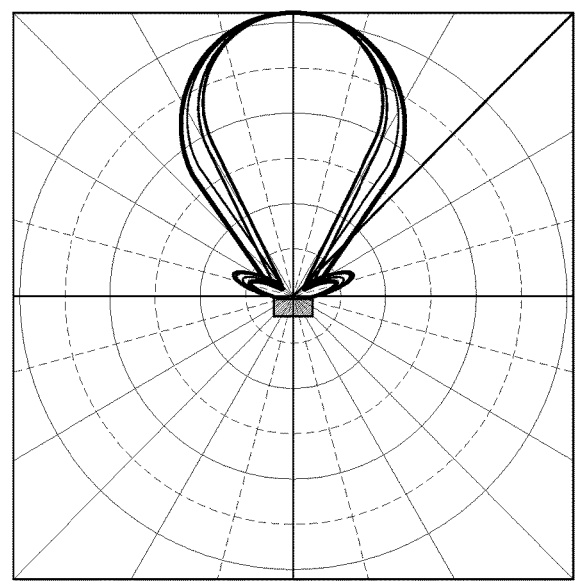
FIG. 13B is a diagram illustrating an example of a light distribution pattern of a planar light source according to some implementations.

FIG. 13A is a diagram illustrating an example of a light distribution pattern of a typical planar light source, and FIG. 13B is a diagram illustrating an example of a light distribution pattern of a planar light source according to some implementations.

If the light emitting surface of a planar light source has a Lambertian reflectance, then the planar light source may not sufficiently achieve a light distribution that satisfies a threshold, for example to comply with regulations.

For example, a Lambertian emission pattern typically has a dependency of a cosine function for each escape angle $\phi$. For example, as shown in FIG. 13A, the light intensity is strongest when the light emission is perpendicular to the light emitting surface, that is, $\phi=0$ degrees, and is reduced to about half of the maximum value when $\phi=60$ degrees.

As such, planar light sources may be used as a taillight, but may be less effective for use as a brake light, due to lacking sufficient generation of output light.

By contrast, according to implementations of the present disclosure, the light distribution pattern emitted from a planar light source may be compressed by an optical member, as shown in FIG. 13B. Therefore, implementations described herein may implement a planar light source that generates greater light output, and thus may satisfy a threshold amount of light output, e.g., as according to regulations.

The light flux that is output from a light source varies, depending on a light distribution pattern, and increases as the light distribution pattern is compressed. If an existing planar light source is used and the light flux of 100 satisfies a threshold amount of light output, then according to implementations of the present disclosure, a light flux that is smaller than 100 may be used to satisfy the same threshold amount of light output by implementing a planar light source. Accordingly, the power consumption may be reduced, and a greater light quantity and/or light intensity may be generated.

In some implementations, a vehicular lamp according to the present disclosure may include a plurality of planar light sources, and may individually control each of the plurality of planar light sources according to predetermined conditions.

Figure 14:
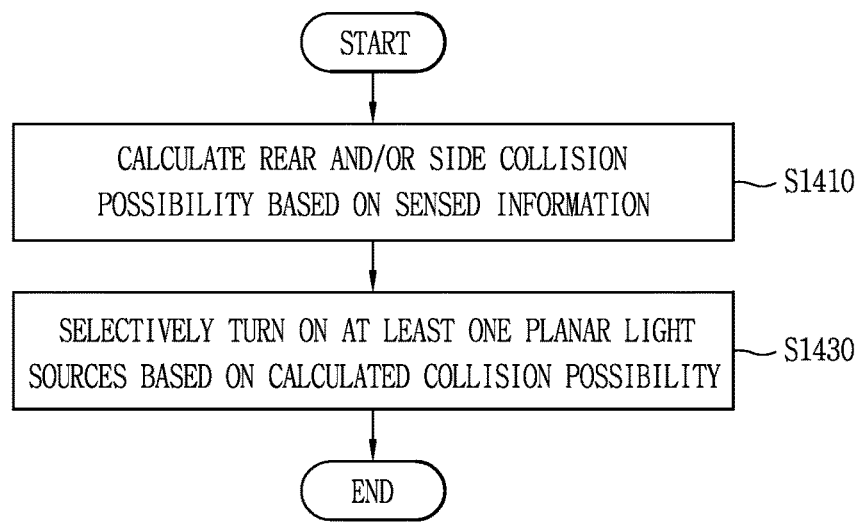
FIG. 14 is a flowchart illustrating an example of controlling planar light sources.

FIG. 14 is a flowchart illustrating an example of controlling planar light sources separately.

A vehicle equipped with the vehicular lamp 1 according to the present disclosure may include various sensors and calculate the possibility of rear and/or the side collision based on sensed information in operation S1410.

Based on the calculated collision probability, the vehicular lamp 1 may selectively turn on at least one of the plurality of planar light sources in operation S1430. Specifically, the vehicular lamp 1 may selectively turn on or off each of the plurality of planar light sources based on the sensed information.

When the planar light sources perform the role of a brake light, they are turned on if a vehicle is braked and turned off if not. At this point, depending on a collision possibility, the planar light sources may be turned on differently.

For example, if there is no collision possibility, all the planar light sources need not to be turned on. Thus, the first planar light source may be turned on and the second and third planar light sources may be kept turned off. Unlike this, if there is a collision possibility, it is necessary to strongly deliver collision warning to an object that is likely to collide. In this case, all the first to third planar light sources may be turned on.

In order for a more three-dimensional operation, in relation to the vehicular lamp 1, the planar light sources may be rotated and moved such that an angle between the turned-off planar light sources is disposed within the first angle range, and an angle between the turned-on planar light sources is disposed within the second angle range.

For example, the first to third planar light sources may be disposed in the second angle range while driving. Thereafter, when braking occurs in a state that there is no collision possibility, only the first planar light source is turned on and is rotated and moved within the first angle range, and the second and third planar light sources are disposed with the second angle range while they are turned off. Thereafter, when braking continues but the collision possibility is greater than the reference, the second and third planar light sources that were turned off may be turned on and rotated and moved within the first angle range.

The present disclosure may also be applied to a vehicle including the vehicular lamp according to the above-mentioned various implementations.

According to some implementations, there is one or more of the following effects.

A vehicular lamp according to the present disclosure includes a core light source and a plurality of planar light sources that surround the core light source. Since the light emitting surface of a planar light source forms an acute angle with a base substrate, when the vehicular lamp 1 is seen from the front, planar light sources form a shape that surrounds the core light source 130. When compared to a human eye, the core light source 130 is a pupil, and the planar light sources have the same visual effect as an eyelid.

Further, the planar light sources are rotated according to predetermined conditions. Accordingly, various three-dimensional effects may be generated. For example, as the collision possibility increases, an angle between a planar light source and a base substrate may gradually increase. As the planar light source gradually rises due to the collision possibility, a collision warning signal may be delivered more effectively.

A vehicular lamp according to the present disclosure may compress a light distribution pattern, which is emitted from a planar light source, toward the front. The light flux that is output from a light source varies, depending on a light distribution pattern, and increases as the light distribution pattern is compressed. If a planar light source is used and the light flux of 100 satisfies a threshold output, then according to implementations of the present disclosure, by compressing the light distribution pattern of the planar light source, a light flux smaller than 100 may be used to satisfy the same threshold output, e.g., according to regulations. Accordingly, power consumption may be reduced, and greater amounts of light quantity and/or light intensity may be achieved using the planar light source.

Various implementations may be implemented using a machine-readable medium having instructions stored thereon for execution by at least one processor, such as control unit 720, to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet).

The examples described above may be implemented in various forms without departing from the characteristics thereof, and the above-described implementations are not limited by any of the details of the foregoing description, unless otherwise specified, but rather should be construed broadly within its scope as defined in the appended claims.

All changes and modifications that fall within the metes and bounds of the claims, or equivalents of such metes and bounds are therefore intended to be embraced by the appended claims.

What is claimed is:

1. A vehicular lamp comprising:
    a lamp housing;
    a base substrate disposed in the lamp housing; and
    a plurality of planar light sources disposed spaced apart from each other on the base substrate,
    wherein each of the plurality of planar light sources has a light emitting surface that protrudes from the base substrate and that forms a respective acute angle with the base substrate relative to a forward direction of the vehicular lamp.

2. The vehicular lamp of claim 1, wherein:
    the plurality of planar light sources are sequentially arranged along a direction from a forward end of the lamp housing to a rear end of the lamp housing, and
    a first area of a first light emitting surface of a first planar light source is different from a second area of a second light emitting surface of a second planar light source among the plurality of planar light sources.

3. The vehicular lamp of claim 2, wherein areas of light emitting surfaces of the plurality of planar light sources are arranged to monotonically increase in the direction from the forward end of the lamp housing to the rear end of the lamp housing.

4. The vehicular lamp of claim 2, wherein a first rear surface of the first planar light source that faces the second light emitting surface of the second planar light source comprises a reflective member configured to reflect light that is emitted from the second light emitting surface of the second planar light source.

5. The vehicular lamp of claim 1, wherein:
    the base substrate has a first surface and a second surface, and
    the plurality of planar light sources comprises:
        a first group of planar light sources disposed on the first surface of the base substrate; and
        a second group of planar light sources disposed on the second surface of the base substrate.

6. The vehicular lamp of claim 5, wherein:
    each light emitting surface of the plurality of planar light sources has a first end facing the base substrate and a second end that is opposite the first end, and
    for the light emitting surfaces of the plurality of planar light sources, a distance between the first end and the second end of respective light emitting surfaces may be arranged to monotonically increase in the direction from a forward end of the lamp housing to a rear end of the lamp housing.

7. The vehicular lamp of claim 5, wherein:
    the first surface and the second surface of the base substrate are inclined in different directions,
    each light emitting surface of the plurality of planar light sources has a first end facing the base substrate and a second end that is opposite the first end, and
    for the light emitting surfaces of the plurality of planar light sources, a distance between the first end and the second end of respective light emitting surfaces are arranged to be the same.

8. The vehicular lamp of claim 1, wherein at least one light emitting surface among the plurality of planar light sources has a first part directed toward a first direction and a second part directed toward a second direction different from the first direction.

9. The vehicular lamp of claim 1, further comprising:
a drive unit configured to rotate and move the plurality of planar light sources; and
at least one processor configured to control the drive unit to vary an angle between the base substrate and at least one light emitting surface of the plurality of planar light sources according to a predetermined condition.

10. The vehicular lamp of claim 9, wherein the at least one processor is further configured to:
based on a first collision likelihood with an object in a predetermined range being detected, control the drive unit to arrange the base substrate and each light emitting surface of the plurality of planar light sources to form a first angle within a first angle range; and
based on a second collision likelihood with the object being detected, where the second collision likelihood is greater than the first collision likelihood, control the drive unit to arrange the base substrate and the each light emitting surface of the plurality of planar light sources to form a second angle within a second angle range.

11. The vehicular lamp of claim 9, wherein the at least one processor is further configured to selectively turn on or off each of the plurality of planar light sources.

12. The vehicular lamp of claim 11, wherein the at least one processor is configured to selectively turn on or off each of the plurality of planar light sources by:
for a first set of planar light sources among the plurality of planar light sources that form angles with the base substrate within a first angle range, turn off the first set of planar light sources; and
for a second set of planar light sources among the plurality of planar light sources that form angles with the base substrate within a second angle range different from the first angle range, turn on the second set of planar light sources.

13. The vehicular lamp of claim 1, wherein each of the plurality of planar light sources comprises:
a substrate;
a plurality of semiconductor light emitting elements disposed on the substrate and configured to emit light; and
an optical member disposed on the plurality of semiconductor light emitting elements and configured to change a light distribution pattern of light emitted from the plurality of semiconductor light emitting elements.

14. The vehicular lamp of claim 13, wherein for each of the plurality of planar light sources, an air gap is defined between the optical member of the planar light source and the plurality of light emitting elements of the planar light source.

15. The vehicular lamp of claim 14, further comprising a support member disposed between the plurality of light emitting elements and the optical member to form the air gap in the planar light source.

16. The vehicular lamp of claim 13, wherein the optical member of each of the plurality of planar light sources comprises a plurality of thin film layers having a first refractive index.

17. The vehicular lamp of claim 13, wherein:
the optical member of each of the plurality of planar light sources comprises an optical layer formed of a light-transmitting material; and
a first surface of the optical layer is formed of a plurality of protrusions having a first form that generates a first light distribution pattern.

18. The vehicular lamp of claim 17, wherein a section of each protrusion of the plurality of protrusions of the first surface of the optical layer has a triangular form having a first angle.

19. The vehicular lamp of claim 17, wherein the first form of each protrusion of the plurality of protrusions of the first surface of the optical layer is a triangular form.

20. A vehicle comprising the vehicular lamp of claim 1.

* * * * *